US012530498B2

(12) United States Patent
Murugadoss et al.

(10) Patent No.: US 12,530,498 B2
(45) Date of Patent: Jan. 20, 2026

(54) APPARATUS AND A METHOD FOR THE ANONYMIZATION OF USER DATA

(71) Applicant: nference, Inc., Cambridge, MA (US)

(72) Inventors: Karthik Murugadoss, Cambridge, MA (US); Sankar Ardhanari, Andover, MA (US)

(73) Assignee: nference, Inc., Cambridge, MA (US)

( * ) Notice: Subject to any disclaimer, the term of this patent is extended or adjusted under 35 U.S.C. 154(b) by 0 days.

(21) Appl. No.: 18/604,154

(22) Filed: Mar. 13, 2024

(65) Prior Publication Data

US 2024/0354445 A1 Oct. 24, 2024

Related U.S. Application Data

(60) Provisional application No. 63/461,121, filed on Apr. 21, 2023.

(51) Int. Cl.
| | |
|---|---|
| *G06F 21/62* | (2013.01) |
| *G06F 40/279* | (2020.01) |
| *G16H 10/60* | (2018.01) |

(52) U.S. Cl.
CPC ........ *G06F 21/6254* (2013.01); *G06F 40/279* (2020.01); *G16H 10/60* (2018.01)

(58) Field of Classification Search
CPC .... G06F 21/6254; G06F 40/279; G16H 10/60
See application file for complete search history.

(56) References Cited

U.S. PATENT DOCUMENTS

| | | | | |
|---|---|---|---|---|
| 6,728,726 | B1* | 4/2004 | Bernstein | G06F 16/289 |
| 7,881,996 | B1* | 2/2011 | Schulz | G06Q 20/40 |
| | | | | 705/40 |
| 8,930,377 | B2* | 1/2015 | Avner | G06F 16/367 |
| | | | | 707/E17.014 |
| 9,202,176 | B1* | 12/2015 | Kapur | G06F 40/279 |
| 9,361,481 | B2* | 6/2016 | LaFever | G06F 21/6254 |
| 9,886,558 | B2* | 2/2018 | Ober | G06F 16/248 |
| 10,340,037 | B2* | 7/2019 | Douglass | G16H 10/60 |
| 10,699,112 | B1* | 6/2020 | Corcoran | G06F 16/313 |
| 10,832,248 | B1* | 11/2020 | Kramme | G06Q 20/409 |
| 11,113,418 | B2 | 9/2021 | Allen et al. | |
| 11,537,748 | B2 | 12/2022 | Austin et al. | |
| 11,586,768 | B2* | 2/2023 | Bulut | G06N 5/048 |
| 12,056,258 | B2* | 8/2024 | Lo | G06F 16/116 |
| 12,154,665 | B2* | 11/2024 | Blum | G06F 21/6254 |
| 12,175,462 | B2* | 12/2024 | Ratakonda | G06Q 20/389 |

(Continued)

*Primary Examiner* — David Garcia Cervetti

(74) *Attorney, Agent, or Firm* — Caldwell Intellectual Property Law

(57) ABSTRACT

An apparatus for the anonymization of user data is disclosed. The apparatus includes at least processor and a memory communicatively connected to the processor. The memory contains instructions configuring the processor to receive a plurality of user data. The memory contains instructions configuring the processor to identify a plurality of patient identifiers within the plurality of user data. The memory contains instructions configuring the processor to generate contextual data associated with each patient identifier of the plurality of patient identifier. The memory contains instructions configuring the processor to identify one or more false positive patient identifiers within the plurality of patient identifiers as a function of the contextual data.

16 Claims, 9 Drawing Sheets

(56) References Cited

U.S. PATENT DOCUMENTS

| | | | |
|---|---|---|---|
| 12,232,816 B2* | 2/2025 | Mahfouz | A61B 8/56 |
| 2004/0078238 A1* | 4/2004 | Thomas | G16H 10/60 |
| | | | 705/3 |
| 2004/0215981 A1* | 10/2004 | Ricciardi | G16H 50/30 |
| | | | 713/176 |
| 2012/0101843 A1* | 4/2012 | Mathur | G06Q 40/08 |
| | | | 705/2 |
| 2013/0104049 A1* | 4/2013 | Johnston | G06F 21/84 |
| | | | 715/741 |
| 2014/0040626 A1* | 2/2014 | Fredinburg | G06F 21/6254 |
| | | | 713/182 |
| 2014/0073057 A1* | 3/2014 | Mischak | G01N 33/6848 |
| | | | 436/86 |
| 2015/0348083 A1* | 12/2015 | Brill | G06Q 20/386 |
| | | | 705/14.23 |
| 2016/0147945 A1* | 5/2016 | MacCarthy | H04W 12/02 |
| | | | 705/51 |
| 2016/0247158 A1* | 8/2016 | Kolotinsky | G06Q 20/4016 |
| 2016/0283745 A1* | 9/2016 | LaFever | G06F 21/6218 |
| 2016/0335397 A1* | 11/2016 | Blum | G16H 10/60 |
| 2018/0046934 A1* | 2/2018 | Aravkin | G06F 21/562 |
| 2018/0260524 A1* | 9/2018 | Rivedal | G16H 40/20 |
| 2018/0358112 A1* | 12/2018 | Sharifi Sedeh | G16H 10/60 |
| 2018/0375817 A1* | 12/2018 | Ge | H04L 51/56 |
| 2019/0065782 A1* | 2/2019 | Selleck | G06F 21/6254 |
| 2019/0130028 A1* | 5/2019 | Rajpathak | G06Q 10/20 |
| 2019/0130068 A1* | 5/2019 | Gondek | G16H 40/67 |
| 2019/0260730 A1* | 8/2019 | Mainali | H04L 63/0861 |
| 2021/0125615 A1* | 4/2021 | Medalion | G06N 3/044 |
| 2021/0256160 A1* | 8/2021 | Hachey | G06N 20/00 |
| 2021/0306804 A1* | 9/2021 | Adler | H04W 4/029 |
| 2022/0104774 A1* | 4/2022 | Qu | A61B 5/7264 |
| 2022/0138508 A1* | 5/2022 | Huang | G06F 18/241 |
| | | | 382/181 |
| 2022/0179890 A1* | 6/2022 | Joko | G06F 40/30 |
| 2022/0284119 A1* | 9/2022 | Chacko | G06F 21/6254 |
| 2022/0391537 A1* | 12/2022 | Gotthardt | H04W 12/02 |
| 2023/0316284 A1* | 10/2023 | Kramme | G06Q 20/34 |
| | | | 705/44 |
| 2023/0334246 A1 | 10/2023 | Vah et al. | |
| 2023/0351009 A1* | 11/2023 | Wright | G06F 21/50 |
| 2023/0385846 A1* | 11/2023 | Ringhiser | G06Q 30/016 |
| 2023/0418978 A1 | 12/2023 | Sublett et al. | |
| 2024/0047044 A1* | 2/2024 | Wisser | G16H 50/20 |
| 2024/0119175 A1* | 4/2024 | Middleton | G06N 3/0895 |
| 2024/0143838 A1* | 5/2024 | Ardhanari | G16H 30/40 |
| 2024/0152867 A1* | 5/2024 | Dyell | G16H 40/20 |
| 2024/0154941 A1* | 5/2024 | Nagpal | H04L 9/0891 |

* cited by examiner

APPARATUS AND A METHOD FOR THE ANONYMIZATION OF USER DATA

CROSS-REFERENCE TO RELATED APPLICATIONS

This application claims the benefit of priority of U.S. Provisional Patent Application Ser. No. 63/461,121, filed on Apr. 21, 2023, and titled "SYSTEMS AND METHODS FOR IMPROVING PERFORMANCE IN A COMPUTING SYSTEM FOR DE-IDENTIFICATION," which is incorporated by reference herein in its entirety.

FIELD OF THE INVENTION

The present invention generally relates to the field of data processing. In particular, the present invention is directed to an apparatus and a method for the anonymization of user data.

BACKGROUND

Managing sensitive data, such as, without limitation, data about patients collected by hospitals, healthcare providers, and/or care givers has long been a labor-intensive process. Data security threats have increased exponentially due to the escalating challenges of data security in an interconnected world.

SUMMARY OF THE DISCLOSURE

In an aspect, an apparatus for the anonymization of user data is disclosed. The apparatus includes at least processor and a memory communicatively connected to the processor. The memory contains instructions configuring the processor to receive a plurality of user data. The memory contains instructions configuring the processor to identify a plurality of patient identifiers within the plurality of user data. The memory contains instructions configuring the processor to generate contextual data associated with each patient identifier of the plurality of patient identifier. The memory contains instructions configuring the processor to identify one or more false positive patient identifiers within the plurality of patient identifiers as a function of the contextual data.

In another aspect, a method for the anonymization of user data is disclosed. The method includes receiving, using at least a processor, a plurality of user data. The method includes identifying, using the at least a processor, a plurality of patient identifiers within the plurality of user data. The method includes generating, using the at least a processor, contextual data associated with each patient identifier of the plurality of patient identifier. The method includes identifying, using the at least a processor, one or more false positive patient identifiers within the plurality of patient identifiers as a function of the contextual data.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations, and fragmentary views. In certain instances, details that are not necessary for an understanding of the embodiments or that render other details difficult to perceive may have been omitted.

DETAILED DESCRIPTION

At a high level, aspects of the present disclosure are directed to an apparatus and a method for the anonymization of user data. The apparatus includes at least processor and a memory communicatively connected to the processor. The memory contains instructions configuring the processor to receive a plurality of user data. The memory contains instructions configuring the processor to identify a plurality of patient identifiers within the plurality of user data. The memory contains instructions configuring the processor to generate contextual data associated with each patient identifier of the plurality of patient identifier. The memory contains instructions configuring the processor to identify one or more false positive patient identifiers within the plurality of patient identifiers as a function of the contextual data. Exemplary embodiments illustrating aspects of the present disclosure are described below in the context of several specific examples.

Figure 1:
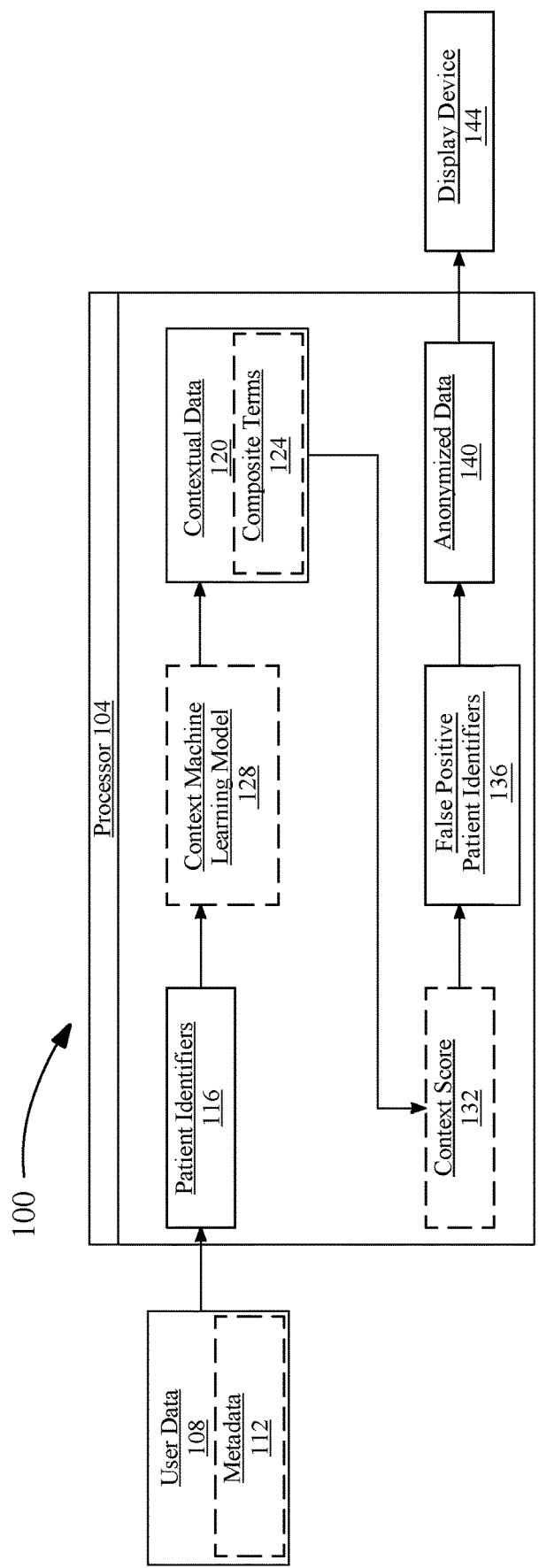
FIG. 1 is a block diagram of an exemplary embodiment of an apparatus for the anonymization of user data.

Referring now to FIG. 1, an exemplary embodiment of an apparatus 100 for the anonymization of user data is illustrated. Apparatus 100 includes a processor 104. Processor 104 may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. Processor 104 may include a single computing device operating independently, or may include two or more computing device operating in concert, in parallel, sequentially or the like; two or more computing devices may be included together in a single computing device or in two or more computing devices. Processor 104 may interface or communicate with one or more additional devices as described below in further detail via a network interface device. Network interface device may be utilized for connecting processor 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Processor 104 may include but is not limited to, for example, a computing device or cluster of computing devices in a first location and a second computing device or cluster of computing devices in a second location. Processor 104 may include one or more computing devices dedicated to data storage, security, distribution of traffic for load balancing, and the like. Processor 104 may distribute one or more computing tasks as described below across a plurality of computing devices of computing device, which may operate in parallel, in series, redundantly, or in any other manner used for distribution of tasks or memory between computing devices. Processor 104 may be implemented using a "shared nothing" architecture in which data is cached at the worker, in an embodiment, this may enable scalability of apparatus 100 and/or computing device.

With continued reference to FIG. 1, processor 104 may be designed and/or configured to perform any method, method step, or sequence of method steps in any embodiment described in this disclosure, in any order and with any degree of repetition. For instance, processor 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Processor 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, apparatus 100 includes a memory. Memory is communicatively connected to processor 104. Memory may contain instructions configuring processor 104 to perform tasks disclosed in this disclosure. As used in this disclosure, "communicatively connected" means connected by way of a connection, attachment, or linkage between two or more relata which allows for reception and/or transmittance of information therebetween. For example, and without limitation, this connection may be wired or wireless, direct, or indirect, and between two or more components, circuits, devices, systems, apparatus, and the like, which allows for reception and/or transmittance of data and/or signal(s) therebetween. Data and/or signals therebetween may include, without limitation, electrical, electromagnetic, magnetic, video, audio, radio, and microwave data and/or signals, combinations thereof, and the like, among others. A communicative connection may be achieved, for example, and without limitation, through wired or wireless electronic, digital, or analog, communication, either directly or by way of one or more intervening devices or components. Further, communicative connection may include electrically coupling or connecting at least an output of one device, component, or circuit to at least an input of another device, component, or circuit. For example, without limitation, via a bus or other facility for intercommunication between elements of a computing device. Communicative connecting may also include indirect connections via, for example, and without limitation, wireless connection, radio communication, low power wide area network, optical communication, magnetic, capacitive, or optical coupling, and the like. In some instances, the terminology "communicatively coupled" may be used in place of communicatively connected in this disclosure.

With continued reference to FIG. 1, processor 104 is configured to receive a plurality of user data 108. As used in the current disclosure, "user data" is data related to the health and medical history of a user. User data 108 may be used for diagnosing and treating medical conditions, conducting research, managing patient care, and making informed healthcare decisions. User data 108 may include a plurality of unstructured data associated with the patient. In some cases, user data 108 may include information from a plurality of electronic health records (EHRs). As used in the current disclosure, "electronic health records" are digital records containing a patient's medical history, diagnoses, medications, treatment plans, and other relevant information. EHRs may be used by healthcare providers to track and manage patient care. User data 108 may include information such as a plurality of medical imaging data. As used in the current disclosure, "medical imaging data" refers to the visual representations of the internal structures and functions of the body obtained through various imaging techniques. Medical imaging data may include data associated with X-rays, CT scans, magnetic resonance imaging, ultrasounds, PET scans, nuclear medicine imaging, mammography, fluoroscopy, and the like. User data 108 may include data from blood tests, urine tests, biopsies, and other diagnostic tests that may be essential for assessing a patient's health and diagnosing diseases. User data 108 may include data associated with the vital signs of the user. This may include data such as blood pressure, heart rate, respiratory rate, and body temperature which are vital for monitoring a patient's condition and overall health. User data 108 may include detailed notes and observations made by healthcare professionals during patient visits, providing additional context to the medical history. User data 108 may be collected in the course of clinical trials, studies, and medical research, which can include genomic data, epidemiological data, and more.

With continued reference to FIG. 1, processor 104 may be configured to receive user data 108 from one or more external systems, such as without limitation, public databases, healthcare management systems, and the like, using an application programming interface (API). As used herein, an "application programming interface" is a set of functions that allow applications to access data and interact with external software components, operating systems, or microdevices, such as another web application or computing device. An API may define the methods and data formats that applications can use to request and exchange information. APIs enable seamless integration and functionality between different systems, applications, or platforms. An API may deliver user data 108 to apparatus 100 from a system/application that is associated with a user, medical provider, or other third-party custodian of user information. An API may be configured to query for web applications or other websites to retrieve user data 108 or other data associated with the user. An API may be further configured to filter through web applications according to a filter criterion. In this disclosure, "filter criterion" are conditions the web applications must fulfill in order to qualify for API. Web applications may be filtered based off these filter criterion. Filter criterion may include, without limitation, web application dates, web application traffic, web application types, web applications addresses, and the like. Once an API filters through web applications according to a filter criterion, it may select a web application. Processor 104 may transmit, through the API, user data 108 to apparatus 100. API may further automatically fill out user entry fields of the web application with the user credentials in order to gain access to the user data 108. Web applications may include, without limitation, a social media website, an online form, file scanning, email programs, third party websites, governmental websites, or the like.

Continuing to refer to FIG. 1, processor 104 may be configured to retrieve user data 108 from a database, such as an EHR database. In some embodiments, this may include retrieving EHR data from a database. In some embodiments, database may be consistent with other databases disclosed in this disclosure. In some embodiments, EHR database may be located in a hospital or hospital network's computing network. In some embodiments, EHR database may be located in the cloud.

Continuing to refer to FIG. 1, processor 104 may extract user data 108 from documents or other text received from the user using an optical character recognition system. Optical character recognition or optical character reader (OCR) may be applied upon submission of user data 108 into processor 104 and includes automatic conversion of images of written information (e.g., typed, handwritten or printed text) into machine-encoded text. In some cases, recognition of at least a keyword from an image component may include one or more processes, including without limitation OCR, optical word recognition, intelligent character recognition, intelligent word recognition, and the like. In some cases, OCR may recognize written text, one glyph or character at a time. In some cases, optical word recognition may recognize written text, one word at a time, for example, for languages that use a space as a word divider. In some cases, intelligent character recognition (ICR) may recognize written text one glyph or character at a time, for instance by employing machine learning processes. In some cases, intelligent word recognition (IWR) may recognize written text, one word at a time, for instance by employing machine learning processes.

Still referring to FIG. 1, in some cases OCR may be an "offline" process, which analyses a static document or image frame. In some cases, handwriting movement analysis can be used as input to handwriting recognition systems. For example, instead of merely using shapes of glyphs and words, this technique may capture motions, such as the order in which segments are drawn, the direction, and the pattern of putting the pen down and lifting it. This additional information can make handwriting recognition more accurate. In some cases, this technology may be referred to as "online" character recognition, dynamic character recognition, real-time character recognition, and intelligent character recognition.

Still referring to FIG. 1, in some cases, OCR processes may employ pre-processing of image component. Pre-processing process may include without limitation de-skew, de-speckle, binarization, line removal, layout analysis or "zoning," line and word detection, script recognition, character isolation or "segmentation," and normalization. In some cases, a de-skew process may include applying a transform (e.g., homography or affine transform) to image component to align text. In some cases, a de-speckle process may include removing positive and negative spots and/or smoothing edges. In some cases, a binarization process may include converting an image from color or greyscale to black-and-white (i.e., a binary image). Binarization may be performed as a simple way of separating text (or any other desired image component) from a background of image component. In some cases, binarization may be required for example if an employed OCR algorithm only works on binary images. In some cases, a line removal process may include removal of non-glyph or non-character imagery (e.g., boxes and lines). In some cases, a layout analysis or "zoning" process may identify columns, paragraphs, captions, and the like as distinct blocks. In some cases, a line and word detection process may establish a baseline for word and character shapes and separate words, if necessary. In some cases, a script recognition process may, for example in multilingual documents, identify script allowing an appropriate OCR algorithm to be selected. In some cases, a character isolation or "segmentation" process may separate signal characters, for example character-based OCR algorithms. In some cases, a normalization process may normalize aspect ratio and/or scale of image component.

Still referring to FIG. 1, in some embodiments an OCR process will include an OCR algorithm. Exemplary OCR algorithms include matrix matching process and/or feature extraction processes. Matrix matching may involve comparing an image to a stored glyph on a pixel-by-pixel basis. In some case, matrix matching may also be known as "pattern matching," "pattern recognition," and/or "image correlation." Matrix matching may rely on an input glyph being correctly isolated from the rest of the image component. Matrix matching may also rely on a stored glyph being in a similar font and at a same scale as input glyph. Matrix matching may work best with typewritten text.

Still referring to FIG. 1, in some embodiments, an OCR process may include a feature extraction process. In some cases, feature extraction may decompose a glyph into features. Exemplary non-limiting features may include corners, edges, lines, closed loops, line direction, line intersections, and the like. In some cases, feature extraction may reduce dimensionality of representation and may make the recognition process computationally more efficient. In some cases, extracted feature can be compared with an abstract vector-like representation of a character, which might reduce to one or more glyph prototypes. General techniques of feature detection in computer vision are applicable to this type of OCR. In some embodiments, machine-learning processes like nearest neighbor classifiers (e.g., k-nearest neighbors algorithm) can be used to compare image features with stored glyph features and choose a nearest match. OCR may employ any machine-learning process described in this disclosure, for example machine-learning processes described with reference to FIG. 2. Exemplary non-limiting OCR software includes Cuneiform and Tesseract. Cuneiform is a multi-language, open-source optical character recognition system originally developed by Cognitive Technologies of Moscow, Russia. Tesseract is free OCR software originally developed by Hewlett-Packard of Palo Alto, California, United States.

Still referring to FIG. 1, in some cases, OCR may employ a two-pass approach to character recognition. Second pass may include adaptive recognition and use letter shapes recognized with high confidence on a first pass to recognize better remaining letters on the second pass. In some cases, two-pass approach may be advantageous for unusual fonts or low-quality image components where visual verbal content may be distorted. Another exemplary OCR software tool includes OCRopus. OCRopus development is led by German Research Centre for Artificial Intelligence in Kaiserslautern, Germany.

Still referring to FIG. 1, in some cases, OCR may include post-processing. For example, OCR accuracy can be increased, in some cases, if output is constrained by a lexicon. A lexicon may include a list or set of words that are allowed to occur in a document. In some cases, a lexicon may include, for instance, all the words in the English language, or a more technical lexicon for a specific field. In some cases, an output stream may be a plain text stream or file of characters. In some cases, an OCR process may preserve an original layout of visual verbal content. In some cases, near-neighbor analysis can make use of co-occurrence frequencies to correct errors, by noting that certain words are often seen together. For example, "Washington, D.C." is generally far more common in English than "Washington DOC." In some cases, an OCR process may make us of a priori knowledge of grammar for a language being recognized. For example, grammar rules may be used to help determine if a word is likely to be a verb or a noun. Distance conceptualization may be employed for recognition and classification. For example, a Levenshtein distance algorithm may be used in OCR post-processing to further optimize results.

With continued reference to FIG. 1, processor 104 is configured to receive a plurality of user data 108 comprising a plurality of metadata 112. As used in the current disclosure, "metadata" refers to descriptive or informational data that provides details about the user data 108. Metadata 112 may include descriptive metadata, wherein descriptive metadata is configured to describe the content, context, and structure of the data. This may include information such as time, geographic location, medical facility names, medical professional logs, patient names, patient IDs, patient data, X-rays, MRIs, CT scans, pet scans, ultrasounds, medical images, medical imaging dates, medical imaging technician information, along with any other patient specific data. Metadata 112 may be used to describe records of how the data has been accessed, utilized, or modified over time, aiding in understanding data usage patterns, and optimizing access. In an embodiment, metadata 112 may include Digital Imaging and Communications in Medicine (DICOM) data. Metadata 112 may refer to any form of data that can identify a patient including but not limited to metadata embedded on a medical image, this may include metadata DICOM headers. DICOM Headers may include patient identity revealing information such as contours of head, body/organ profile, etc. In some embodiments, metadata 112 may provide details regarding the management and administration of the data, such as access rights, permissions, versioning, and preservation information. It may include information such as titles, authors, dates, keywords, summaries, and abstracts data or information that is collected, processed, or generated passively in the background without requiring direct input or actions from the user. This data is often gathered by applications, devices, or systems for various purposes, such as improving user experiences, enhancing functionality, or aiding in analytics.

With continued reference to FIG. 1, metadata 112 may be detached from the user data 108 using various methods and techniques depending on the type and structure of the data. Detaching metadata 112 from user data 108 is the process of separating identifying or contextual information from the core content or information provided by users. This practice may be useful for safeguarding individual privacy and data anonymity. By removing metadata, such as geolocation, timestamps, or user identifiers, from the associated data, it becomes significantly more challenging to trace the information back to specific individuals, thus reducing the risk of unauthorized surveillance or misuse of personal information. Detaching metadata may protect user privacy and maintain data integrity in an increasingly interconnected digital. In some cases, data profiling tools automatically analyze the dataset to detach metadata, including statistical summaries (e.g., min, max, mean, standard deviation), data distributions, unique values, and data quality metrics. Profiling tools can help understand the data's characteristics and identify anomalies. Additionally, Software tools may be used to analyze the data to infer its underlying schema or structure. This process involves identifying data types, keys, relationships, and constraints based on patterns and regularities within the dataset. It's especially useful for unstructured or semi-structured data. In a non-limiting embodiment, a natural language processing techniques can be used to extract metadata such as keywords, entities, topics, and sentiment analysis. NLP algorithms can automatically annotate and categorize text, providing valuable metadata about the content. Language processing techniques are discussed in greater detail below. In an additional embodiment, machine learning algorithms can be trained to identify and extract specific metadata elements from the dataset. For example, a model could be trained to recognize dates, names, or numerical values within the dataset. For datasets sourced from the web, web scraping techniques, mentioned herein above, can be employed to extract metadata from web pages. This could include extracting information about the source, publication date, author, or any other relevant metadata present on the web. In a third embodiment, metadata 112 may be extracted from the user data 108 utilizing APIs and data catalogs associated with specific datasets or data sources can provide standardized metadata. APIs often offer programmatic access to metadata and dataset information.

With continued reference to FIG. 1, processor 104 identifies a plurality of patient identifiers 116 within the plurality of user data 108. As used in the current disclosure, "patient identifiers" refers to information used to identify and distinguish individual patients in healthcare records and systems. Patent identifiers 116 may include any identifiers described in the Health Insurance Portability and Accountability Act (HIPAA). Examples of patient identifiers include the name, address, phone number, email address, phone number, email address, social security number (SSN), national identification number, medical record number, health insurance information, beneficiary information, account numbers, and the like. Patient identifiers 116 may additionally include social media, web addresses, IP addresses, biometric identifiers (i.e., fingerprints, voice prints, and the like), full face photographic images, any comparable images, and the like. Patient identifiers 116 may include all geographic subdivisions smaller than a state, including street address, city, county, precinct, zip code, and their equivalent geocodes. Processor 104 may also identify a plurality of patient identifiers 116 within the metadata 112 associated with the plurality of user data 108. In an embodiment, patient identifiers 116 may include temporal data. As used in the current disclosure, "temporal data" is data related to the date or time that an event occurred. Temporal data may be any time or date that is a part of the user data 108. Temporal data may include all dates directly related to an individual, including birth date, admission date, discharge date, date of death, and the like. Temporal data may include data associated with the date medical image or a medical test was taken. Temporal data may include dates associated with surgery, procedure, admission, medical professional examinations/appointments, medical tests, symptoms, date of birth, date of death, and the like. Processor 104 may identify a plurality of patient identifiers 116 using a named entity recognitions system, data extraction from an EHR, an identification Machine Learning model, contextual analysis, and the like.

With continued reference to FIG. 1, a NER system may generate a plurality of named entities associated with patient identifiers 116 using a natural language processing model. As used in the current disclosure, a "natural language processing (NLP) model" is a computational model designed to process and understand human language. It leverages techniques from machine learning, linguistics, and computer science to enable computers to comprehend, interpret, and generate natural language text. The NLP model may preprocess the textual data, wherein the input text may include all text contained within the user data 108 its associated metadata 112, or any other data mentioned herein. Preprocessing the input text may involve tasks like tokenization (splitting text into individual words or sub-word units), normalizing the text (lowercasing, removing punctuation, etc.), and encoding the text into a numerical representation suitable for the model. The NLP model may include transformer architecture, wherein the transformers are deep learning models that employ attention mechanisms to capture the relationships between words or sub-word units in a text sequence. They consist of multiple layers of self-attention and feed-forward neural networks. The NLP model may weigh the importance of different words or sub-word units within a text sequence while considering the context. It enables the model to capture dependencies and relationships between words, considering both local and global contexts. This process may be used to identify a plurality of named entities. Language processing model may include a program automatically generated by processor 104 and/or named entity recognition system to produce associations between one or more significant terms extracted from the user data 108 its associated metadata 112 and detect associations, including without limitation mathematical associations, between such significant terms. Associations between language elements, where language elements include for purposes herein extracted significant terms, relationships of such categories to other such term may include, without limitation, mathematical associations, including without limitation statistical correlations between any language element and any other language element and/or language elements. Statistical correlations and/or mathematical associations may include probabilistic formulas or relationships indicating, for instance, a likelihood that a given extracted significant term indicates a given category of semantic meaning. As a further example, statistical correlations and/or mathematical associations may include probabilistic formulas or relationships indicating a positive and/or negative association between at least an extracted significant term and/or a given semantic relationship; positive or negative indication may include an indication that a given document is or is not indicating a category semantic relationship. Whether a phrase, sentence, word, or other textual element in the user data 108 its associated metadata 112 constitutes a positive or negative indicator may be determined, in an embodiment, by mathematical associations between detected significant terms, comparisons to phrases and/or words indicating positive and/or negative indicators that are stored in memory at processor 104, or the like.

With continued reference to FIG. 1, processor 104 may identify a plurality of patient identifiers 116 using a named entity recognition (NER) system. As used in the current disclosure, a "named entity recognition (NER) system" is software that identifies a plurality of named entities in from text. A NER system may be configured to identify a plurality of named entities from user data 108 its associated metadata 112. Inputs of a NER system may include a user data 108, metadata 112, and the like. The output of a named entity recognition system may include a plurality of named entities associated with known patient identifiers 116. Named entities may include a structured representation of the identified named entities, typically in the form of annotations or tags attached to the original text.

With continued reference to FIG. 1, processor 104 may identify a plurality of patient identifiers 116 using a pattern recognition process. As used in the current disclosure, a "pattern recognition process" is a process configured to recognize specific patterns or structures commonly associated with patient identifiers. Processor 104 may be configured to define one or more patterns associated with the plurality of patient identifiers 116. These patterns can be based on regular expressions or specific rules that describe the format of each identifier. In a non-limiting example, a pattern for recognizing temporal data might be in the format "MM/DD/YYYY." In an additional non-limiting example, a pattern for recognizing an SSN might be in the format "XXX-XX-XXXX." In some cases, the user data 108 may be segmented into discrete sections or fields, such as patient demographics, medical history, and clinical notes. The pattern recognition process may be applied to each section separately to identify patient identifiers 116. The processor 104 may compare the text within each section of the user data 108 to the predefined patterns. It looks for instances where the text matches the expected pattern for a particular identifier. In a non-limiting example, if the pattern recognition algorithm encounters a sequence of numbers in the format "MM/DD/YYYY," it may identify this as a date of birth.

With continued reference to FIG. 1, processor 104 may identify a plurality of patient identifiers 116 using an identification machine-learning model. As used in the current disclosure, an "identification machine-learning model" is a machine-learning model that is configured to identify a plurality of patient identifiers 116. An identification machine-learning model may be consistent with the machine-learning model described below in FIG. 2. Inputs to the identification machine-learning model may include user data 108, metadata 112, temporal data, medical imaging data, examples of plurality of patient identifiers 116, and the like. Outputs to the identification machine-learning model may include plurality of patient identifiers 116 tailored to the user data 108 its associated metadata 112. Identification training data may include a plurality of data entries containing a plurality of inputs that are correlated to a plurality of outputs for training a processor by a machine-learning process. In an embodiment, identification training data may include a plurality of user data 108 its associated metadata 112 correlated to examples of plurality of patient identifiers 116. Identification training data may be received from database. Identification training data may contain information about user data 108, metadata 112, temporal data, medical imaging data, examples of plurality of patient identifiers 116, and the like. In an embodiment, identification training data may be iteratively updated as a function of the input and output results of past identification machine-learning model or any other machine-learning model mentioned throughout this disclosure. In an embodiment, an identification machine-learning model may refer to a plurality of machine learning models. Each machine learning model may be trained on a unique set of training data. These models may be designed to recognize different patient identifiers 116, such as medical record numbers, insurance IDs, or patient names. The process of identifying PII within a dataset may involve combining the results from each of the plurality of machine learning models. This aggregation step may ensure that the system can accurately and comprehensively identify individual PII across different databases or records. The machine-learning model may be performed using, without limitation, linear machine-learning models such as without limitation logistic regression and/or naive Bayes machine-learning models, nearest neighbor machine-learning models such as k-nearest neighbors machine-learning models, support vector machines, least squares support vector machines, fisher's linear discriminant, quadratic machine-learning models, decision trees, boosted trees, random forest machine-learning model, and the like.

With continued reference to FIG. 1, processor 104 is configured to generate contextual data 120 associated with each patient identifier of the plurality of patient identifiers 116. As used in the current disclosure, "contextual data" refers to the information that provides background or circumstances surrounding the use of a patient identifier. This data may be valuable for understanding the context in which a patient identifier 116 appears, going beyond the mere identification number or name to include the surrounding textual data or data environment that gives additional meaning or clarification. Contextual data 120 may include information that surrounds or is linked to a patient identifier 116 within healthcare records or systems. This data may provide further insights or clarifications about the patient or the circumstances under which the identifier is used, enhancing the understanding and management of patient information. Contextual data 120 may include information about the relationship between the patient identifiers 116 and its surrounding text. This may include information describing how surrounding text modifies the meaning of the alleged patient identifier 116. Processor 104 may generate contextual data 120 by analyzing the text or data around patient identifiers to extract meaningful information that can clarify the identifier's usage or significance. In non-limiting example, the term "smith" has been identified as a patient identifier 116 from the following string of text "The patient exercised on the smith machine for 20 minutes." The processor 104 may analyze the surrounding text to determine that in this instance, "Smith" refers to a "Smith machine," a piece of exercise equipment, rather than a patient's last name. This clarification is vital for accurate data interpretation and avoids misclassification of equipment as patient information. This approach highlights the importance of understanding not just the identifiers themselves but also the context in which they are used, to enhance the management and interpretation of patient information.

With continued reference to FIG. 1, generating contextual data 120 may include generating a set of composite terms 124 within the plurality of user data 108. As used in the current disclosure, a "composite term" is a phrase or term that contextualizes one or more patient identifiers 116. A composite term 124 may be defined as a phrase or term that combines a patient identifier 116 with one or more additional terms derived from the surrounding text, effectively contextualizing the identifier. This approach acknowledges that the meaning of a term can significantly shift based on its context. By crafting composite terms, apparatus 100 may be able to gain a nuanced understanding of patient identifiers 116, going beyond the term's literal interpretation. Composite terms 124 may be crafted by integrating patient identifiers 116 with surrounding or related terms, thereby creating phrases that encapsulate a broader or more specific context. This may be done to distinguish between different uses of similar or identical terms. A composite term 124 may be identified by combining a seed term (i.e., a patient identifier 116) with one or more additional terms derived from a shared local context. Examples of composite terms 124 may include smith machine, Bruce protocol, Wilson's disease, St. John's Wort, Adam's Apple, Huntington's Disease, and the like. Each of these terms combines a potential patient identifier 116 with additional context that clarifies or specifies its use. For instance, "smith machine" refers to exercise equipment rather than a patient name, and "Bruce protocol" identifies a specific type of stress test rather than an individual named Bruce. This additional context may or may not change the original interpretation of the word by the patient identifier 116.

With continued reference to FIG. 1, in an embodiment, generating a set of composite terms 124 may include creating a dictionary or a similar data structure that maps keys to values. As used in the current disclosure, a "dictionary data structure" is a data structure designed to map keys to their corresponding values. Keys may be simple terms (like "Bruce") and values being the corresponding composite terms 124 (like "Bruce protocol"). Keys may be terms that are commonly identified as patient identifiers or other PII. Mapping keys to composite terms may facilitate the interpretation of user data by enabling a system to identify when a key appears within the data and to subsequently retrieve the matching composite term from the dictionary. This dictionary data structure may serve as a tool for understanding specific terms within a broader context, particularly in applications where it's essential to link PII with more detailed or composite terms 124 derived from surrounding text. The objective may be to provide a clearer and more precise interpretation of the terms' meanings within the given context. This dictionary may serve as a reference for interpreting user data 108. In a non-limiting example, when a term like "Bruce" appears in the data, the system may refer to the dictionary to find a matching key, and then retrieves the associated composite term ("Bruce protocol"). Additionally, the composite terms and their mappings within the dictionary data structure can be stored and managed in a database or a specific table within a database. This storage solution supports scalability and dynamic management of large data sets, making it suitable for applications that require the handling and interpretation of extensive information. The use of a database or table for storing these composite terms enables efficient querying, updating, and management of the terms, thereby enhancing the system's ability to contextualize and interpret data accurately. In an embodiment, composite terms 124 and/or keys may be received by the dictionary data structure by analyzing a large corpus of external documents (particularly for untagged patient identifiers). This may include analyzing the external documents (e.g., conference papers, news articles, and/or any external databases) using NLP, NER, and/or any other language processing methods disclosed herein. These terms may then be stored within the dictionary data structure for use by processor 104. In some cases, processor 104 may be configured to receive a list of composite terms 124 and/or contextual data from the dictionary data structure.

With continued reference to FIG. 1, the generation of contextual data 120 may include analyzing and interpreting the surrounding text or data elements associated with patient identifiers. This process is designed to enhance the accuracy and utility of patient information by providing a deeper understanding of the context in which identifiers are used. Processor 104 may analyze the text surrounding a patient identifier 116 using natural language processing (NLP) techniques, such as tokenization, part-of-speech tagging, and named entity recognition (NER), are employed to understand the structure, and meaning of the text. This analysis helps in identifying relevant context, such as the presence of medical equipment, procedures, or conditions mentioned alongside the patient identifier. An NLP may tokenize text within the user data 108. This may be done by breaking down the text into smaller units or 'tokens'. In this process, a sentence or a phrase is segmented into words, phrases, symbols, or other meaningful elements that serve as the basic building blocks for analysis. For example, in the sentence "The patient was placed in the Bruce protocol." Tokenization may divide this into individual tokens like "patient", "Bruce protocol," and the like. This may allow processor 104 to analyze and understand the text at a more granular level, identifying and processing each token separately. In an embodiment, processor 104 may employ one or more artificial intelligence algorithms to analyze the text and identify words or phrases that are pivotal to understanding the context of the patient identifier 116.

With continued reference to FIG. 1, each token may be analyzed to determine its part of speech (noun, verb, adjective, etc.). This step is crucial for understanding the grammatical structure of the sentence and how each word contributes to its overall meaning. POS tagging helps in identifying relationships between words and can be instrumental in recognizing the context in which a patient identifier is used. By understanding the grammatical function of each word, the processor can more accurately infer the meaning of sentences. For instance, distinguishing between "Wilson" as a proper noun indicating a name of a person versus "Wilson's Disease" as a common noun can change the interpretation of a patient's record. This distinction is critical in contexts where the grammatical structure influences the meaning of patient-related information. POS tagging may help in disambiguating words that have multiple uses. Many words in the English language can serve as both nouns and verbs (e.g., "record" or "test"), and their meanings can vary significantly based on their grammatical roles. Identifying these roles aids in correctly interpreting the text's intent, enhancing the processor's ability to accurately associate patient identifiers with their relevant context. In healthcare records, complex sentences that describe patient conditions, treatments, or outcomes are common. POS tagging may enable the processor to navigate these complexities by understanding the structure of sentences. It helps identify key components like the subject, object, and verbs, making it easier to extract meaningful information related to patient identifiers. For example, knowing that a particular token is an adjective modifying a medical condition can highlight the severity or nature of the condition, adding depth to the contextual data.

With continued reference to FIG. 1, processor 104 may employ a NER system to identify and classify tokens. The NER system is discussed in greater detail herein above. A Named Entity Recognition (NER) system may classify tokens into predefined categories by analyzing the text data to identify and categorize specific entities according to their relevance and meaning. This process may involve parsing the text to detect patterns and contextual clues that suggest the category to which a token belongs. Categories may be related to patient identifiers 116 such as person names, locations, dates, times, and specialized terms like medical conditions or procedures. The system may employ machine learning algorithms, which may be trained on large datasets annotated with examples of named entities, to learn the characteristics that typically define each category. For instance, capitalization might indicate a proper noun like a person's name or a location, while certain keywords or phrases could signal a medical condition. By evaluating these features in the context of surrounding words and applying learned models, the NER system can accurately assign each token to its appropriate category, enabling the structured extraction of information from unstructured text data.

With continued reference to FIG. 1, processor 104 may be configured to generate contextual data 120 by analyzing the surrounding text or data elements associated with patient identifiers 116 using a suite of NLP techniques. These techniques include tokenization, part-of-speech (POS) tagging, and named entity recognition (NER), each playing a vital role in dissecting and understanding the textual content. Tokenization may be used to break down complex strings of text into manageable units or tokens, such as words, phrases, or symbols, enabling the processor to analyze the text at a granular level. This step may be used to identify the basic elements within the text and set the stage for deeper analysis. Following tokenization, POS tagging may assign grammatical categories to each token, revealing the structure of sentences and the relationships between words. This understanding is crucial for interpreting the meaning of text accurately, especially in distinguishing between different uses of the same word in medical contexts. NER may take this analysis further by classifying tokens into predefined categories such as names, medical conditions, or procedures. This classification is essential for identifying relevant entities in the text and associating them with patient identifiers 116. Together, these NLP techniques may allow the processor 104 to generate contextual data 120 that provides insights into the circumstances surrounding the use of patient identifiers. By analyzing and interpreting the surrounding text, the processor 104 can clarify the significance of patient identifiers 116. This With continued reference to FIG. 1, processor 104 can identify relevant contextual data 120 surrounding patient identifiers 116 using one or more of the aforementioned NLP processing techniques. For instance, if a patient identifier is mentioned alongside specific medical equipment or procedures, the system can recognize these as critical contextual elements. This recognition is vital for understanding the scenario in which the patient identifier is used, whether it refers to a treatment, diagnosis, or any other medical process.

With continued reference to FIG. 1, processor 104 may generate contextual data 120 using a context machine-learning model 128. As used in the current disclosure, a "context machine-learning model" is a machine-learning model that is configured to generate contextual data 120, context machine-learning model 128 may be consistent with the machine-learning model described below in FIG. 2. Inputs to the context machine-learning model 128 may include user data 108, metadata 112, patient identifiers 116, examples of contextual data 120, and the like. Outputs to the context machine-learning model 128 may include contextual data 120 tailored to the patient identifiers 116, contextual training data may include a plurality of data entries containing a plurality of inputs that are correlated to a plurality of outputs for training a processor by a machine-learning process. In an embodiment, contextual training data may include a plurality of patient identifiers 116 correlated to examples of contextual data 120, contextual training data may be received from database 300, contextual training data may contain information about user data 108, metadata 112, patient identifiers 116, examples of contextual data 120, and the like. In an embodiment, contextual training data may be iteratively updated as a function of the input and output results of past context machine-learning model 128 or any other machine-learning model mentioned throughout this disclosure. The machine-learning model may be performed using, without limitation, linear machine-learning models such as without limitation logistic regression and/or naive Bayes machine-learning models, nearest neighbor machine-learning models such as k-nearest neighbors machine-learning models, support vector machines, least squares support vector machines, fisher's linear discriminant, quadratic machine-learning models, decision trees, boosted trees, random forest machine-learning model, and the like.

Incorporating the user feedback may include updating the training data by removing or adding correlations of user data to a path or resources as indicated by the feedback. Any machine-learning model as described herein may have the training data updated based on such feedback. For example, correlations in training data may be based on outdated information wherein, a web crawler may update such correlations based on more recent resources and information.

With continued reference to FIG. 1, processor 104 may use user feedback to train the machine-learning models and/or classifiers described above. For example, machine-learning models and/or classifiers may be trained using past inputs and outputs of context machine-learning model 128. In some embodiments, if user feedback indicates that an output of machine-learning models and/or classifiers was "bad," then that output and the corresponding input may be removed from training data used to train machine-learning models and/or classifiers, and/or may be replaced with a value entered by, e.g., another value that represents an ideal output given the input the machine learning model originally received, permitting use in retraining, and adding to training data; in either case, classifier may be retrained with modified training data as described in further detail below. In some embodiments, training data of classifier may include user feedback.

With continued reference to FIG. 1, in some embodiments, an accuracy score may be calculated for the machine-learning model and/or classifier using user feedback. For the purposes of this disclosure, "accuracy score," is a numerical value concerning the accuracy of a machine-learning model. For example, the accuracy/quality of the output of the context machine-learning model 128 may be averaged to determine an accuracy score. In some embodiments, an accuracy score may be determined for quality/relevance of the contextual data 120. Accuracy score or another score as described above may indicate a degree of retraining needed for a machine-learning model and/or classifier. Processor 104 may perform a larger number of retraining cycles for a higher number (or lower number, depending on a numerical interpretation used), and/or may collect more training data for such retraining. The discussion within this paragraph and the paragraphs preceding this paragraph may apply to both the context machine-learning model 128 and/or any other machine-learning model/classifier mentioned herein.

With continued reference to FIG. 1, processor 104 may generate a context score 132 for each patient identifier of the plurality of patient identifiers 116. As used in the current disclosure, a "context score" is a quantitative metric that evaluates the degree to which a contextual data 120 modifies the meaning of the patient identifier 116. This score may be derived from analyzing the patterns, correlations, or connections that exist between two or more datasets (i.e., contextual data 120 and patient identifiers 116). Context scores 132 may be employed to quantify the meaning of a patient identifier 116 within its given context. Specifically, a context score 132 may be used to quantify the likelihood that a given patient identifier 116 was misidentified due to a misinterpretation of its context. In an embodiment, generating a context score 132 may include a systematic comparison of set of composite terms 124 to one or more patient identifiers 116. It may be used to evaluate the clarity and specificity with which patient identifiers 116 are used within healthcare records. By assigning a numerical value to this relationship, apparatus 100 can assess and potentially improve the precision with which user data is interpreted and managed. The context score 132 may be calculated by analyzing the interactions between contextual data 120 and patient identifiers 116. This may involve examining the patterns, correlations, or connections that contextual data 120 has with the patient identifier 116. For instance, the analysis might consider how often a patient identifier 116 appears in conjunction with specific medical conditions, treatments, or equipment within the text, and how these associations might clarify or confuse the identifier's meaning.

With continued reference to FIG. 1, one potential application of the context score 132 may be to quantify the likelihood that a patient identifier 116 has been misinterpreted due to its context. A high context score may indicate a clear, unambiguous connection between the identifier and its contextual data, suggesting a low risk of misidentification. Conversely, a low context score could signal a high risk of misidentification, indicating that the identifier's meaning is significantly altered or obscured by its context. Machine learning models can play a crucial role in generating context scores 132 by learning from patterns and correlations in large datasets. These models can automate the identification of significant contextual relationships and continuously refine the scoring process based on new data and feedback. The context scores 132 may be normalized or standardized to ensure comparability across different datasets or variables. This means that the score is often scaled to fall within a specific range (i.e., 0 to 1 or −1 to 1). Normalization techniques can include min-max scaling, z-score normalization, or logarithmic transformation. In an embodiment, a context score 132 may be expressed as a numerical score, a linguistic value, or an alphabetical score. A non-limiting example, of a numerical score, may include a scale from 1-10, 1-100, 1-1000, and the like. In another non-limiting example, linguistic values may include, "No Modification," "Slight Modification," "Significantly modified," and the like. In some embodiments, linguistic values may correspond to a linguistic variable score range. For example, a user data 108 that receives a score between 40-60, on a scale from 1-100, may be considered the linguistic value "Significantly modified."

With continued reference to FIG. 1, processor 104 may compare the patient identifiers 116 to a set of composite terms 124. The comparison may involve analyzing patient identifiers against the set of composite terms 124 to determine the degree of match or relevance. This can be achieved through various methods, including string matching, semantic analysis, or machine learning algorithms that can understand the nuances of language and context. The comparison may be done via direct matching of patient identifiers 116 to a set of composite terms 124. This may involve directly matching patient identifiers 116 with composite terms 124. This step may check if a patient identifier 116 directly appears within any of the composite terms. In some cases, processor 104 may compare the set of composite terms 124 to the patient identifiers 116 using contextual analysis. This may involve analyzing the context in which both the patient identifiers and the composite terms are used. This might involve assessing the proximity of the identifiers to key contextual words or phrases in the text or understanding the semantic relationships between words. In some cases, processor 104 may employ NLP, as discussed herein above, to perform the comparison. The NLP may implement techniques such as word embeddings or semantic analysis to assess the similarity between patient identifiers 116 and the context encapsulated by the composite terms 124. This may help in identifying matches that may not be immediately obvious through direct comparison, by understanding the underlying meaning of the terms. Based on the comparison results, a contextual score 132 may be generated for each patient identifier. This score may quantify the level of match or relevance between the patient identifier and the composite terms. A higher score indicates a strong correlation, suggesting that the patient identifier is well contextualized within the healthcare records. Conversely, a lower score might indicate a weak correlation, signaling potential ambiguities or misinterpretations in how the identifier is used. The scoring might consider factors like the frequency of matches, the semantic closeness, and the clarity of the contextual association. The context scores 132 can help prioritize identifiers for review or further analysis, especially in cases where the match is ambiguous, or the context suggests a potential misclassification.

With continued reference to FIG. 1, Processor 104 may rank patient identifiers 116 according to their scores by implementing a sorting algorithm that orders the patient identifier 116 based on the quantitative values of their scores. After each patient identifier 116 has been evaluated and assigned a context score 132, the processor may initiate the ranking process. Processor 104 may compare the scores of different patient identifier 116, placing the ones with higher scores at the top of the list and those with lower scores towards the bottom. This ranking may be done in ascending order, ensuring that the identifiers that have been modified the most are prioritized. The processor 104 may also handle profiles with identical scores by either ranking them equally or using secondary criteria for further differentiation, such as cross referencing known medical terms and medical dictionaries. The result may be an ordered list or a ranked set of patient identifiers 116. This ranked list may be used by processor 104 to identify and false positives within the patient identifiers 116.

With continued reference to FIG. 1, processor 104 may generate context score 132 using a score machine-learning model. As used in the current disclosure, a "score machine-learning model" is a machine-learning model that is configured to generate context score 132. Score machine-learning model may be consistent with the machine-learning model described below in FIG. 2. Inputs to the score machine-learning model may include user data 108, metadata 112, patient identifier 116, contextual data 120, composite terms 124, examples of context score 132, and the like. Outputs to the score machine-learning model may include context score 132 tailored to the comparison of composite terms 124 to one or more patient identifiers 116. Score training data May include a plurality of data entries containing a plurality of inputs that are correlated to a plurality of outputs for training a processor by a machine-learning process. In an embodiment, score training data may include one or more composite terms 124 and one or more patient identifiers 116 correlated to examples of context scores 132. Score training data may be received from database 300. Score training data may contain information about user data 108, metadata 112, patient identifier 116, contextual data 120, composite terms 124, examples of context score 132, and the like. In an embodiment, Score training data may be iteratively updated as a function of the input and output results of past score machine-learning model or any other machine-learning model mentioned throughout this disclosure. The machine-learning model may be performed using, without limitation, linear machine-learning models such as without limitation logistic regression and/or naive Bayes machine-learning models, nearest neighbor machine-learning models such as k-nearest neighbors machine-learning models, support vector machines, least squares support vector machines, fisher's linear discriminant, quadratic machine-learning models, decision trees, boosted trees, random forest machine-learning model, and the like.

With continued reference to FIG. 1, score machine-learning model may be configured to generate a context score 132 using a fuzzy matching process. As used in the current disclosure, a "fuzzy matching process" is a technique used in data analysis and information retrieval to compare and match strings or data points that are not an exact match but are similar or closely related. Processor 104 may be configured to choose a fuzzy matching algorithm or method based on the specific requirements and the level of similarity that is desired. Fuzzy matching algorithms may include Levenshtein distance, Jaccard Similarity, Cosine Similarity, Soundex and Metaphore, and the like. Processor 104 may be configured to determine a similarity threshold that defines what level of similarity that is desired between composite terms 124 and patient identifiers 116. The threshold can be set based on the trade-off between precision and recall. The processor 104 may set a similarity threshold to define the level of similarity required to compare composite terms 124 to patient identifiers 116. This threshold may determine how strict or lenient the matching should be. A lower threshold results in more matches (higher recall) but potentially less accuracy, while a higher threshold ensures more precise matches (higher precision) but may miss some relevant matches. In an embodiment, composite terms 124 to patient identifiers 116 may each be represented as a fuzzy set. In fuzzy set theory, data points can have degrees of membership rather than a binary state (completely in or out of a set), which suits the concept of "partial matching" inherent in fuzzy matching. In the current case, score machine-learning model may attempt to quantify the level of a partial matching between composite terms 124 and patient identifiers 116 to generate a context score 132. Processor 104 may compare each fuzzy set and identify a context score 132 as a function of the comparison.

With continued reference to FIG. 1, processor 104 may be configured to identify one or more false positive patient identifiers 136 within the plurality of patient identifiers 116 as a function of the contextual data 120. As used in the current disclosure, a "false positive patient identifier" is a term or set of terms that have been incorrectly identified as a patient identifier. A false positive patient identifier 136 may include any term or set of terms erroneously tagged as a patient identifier. This misidentification can occur for several reasons, including the misinterpretation of data by automated systems due to the complex and nuanced nature of medical texts. False positive patient identifiers 136 arise when terms unrelated to an individual's identity, such as drug names, medical devices, procedures, or conditions (e.g., "Huntington's disease"), are incorrectly classified as personal identifiable information (PII). This misclassification is often due to the automated system's inability to contextualize properly. The system may misinterpret proper nouns or capitalized words, assuming they are patient names or other forms of PII. This challenge is exacerbated in the medical field, where terminology is dense, specialized, and context-dependent. Medical texts include numerous terms that carry multiple meanings depending on their use case. An automated system's failure to grasp the full context can lead to the misidentification of these terms as patient identifiers 116. False positive patient identifiers 136 may occur when a machine learning model trained too closely on specific datasets may not perform well when exposed to new, unseen data, leading to a higher rate of false positives. These models might not effectively distinguish between actual patient identifiers and other terms. In some cases, A machine learning model trained too closely on specific datasets may not perform well when exposed to new, unseen data, leading to a higher rate of false positives. These models might not effectively distinguish between actual patient identifiers and other terms. In other cases, user data 108 and other healthcare records may include numerous ambiguous terms. Without clear rules for disambiguation, systems might err on the side of caution and wrongly tag non-identifiers as patient information, aiming to minimize the risk of missing genuine identifiers.

With continued reference to FIG. 1, processor 104 filter the plurality of patient identifiers 116 as a function of the set of composite terms 124. Filtering patient identifiers 116 according to a set of composite terms 124 may involve a process where patient identifiers 116 are analyzed and validated against composite terms 124 to ensure their relevance and accuracy within user data 108. The filtering process may involve comparing identified patient identifiers against the set of composite terms. This comparison helps determine whether an identifier is accurately contextualized within the healthcare records. The purpose of this comparison may be to validate the context in which patient identifiers are used. Identifiers that match or align closely with composite terms are confirmed to be used in the correct context, enhancing the integrity of patient data. Through this process, potential false positive patient identifiers 136 (terms incorrectly identified as patient identifiers due to contextual ambiguity) can be filtered out. This may be achieved by identifying mismatches between the patient identifiers 116 and the composite terms 124, indicating that an identifier may have been misinterpreted. The outcome of the filtering process may be a refined set of patient identifiers 116 that are more accurately contextualized according to the composite terms 124. This refinement process ensures that each identifier is relevant and correctly associated with its intended context within the healthcare records.

With continued reference to FIG. 1, processor 104 may be configured to filter the plurality of patient identifiers 116 as a function of the context score 132. Filtering patient identifiers 116 based on a context score 132 may involve using a quantitative measure to evaluate the accuracy of the identified PII. The context score 132 may quantify the degree to which contextual data 120 modifies or clarifies the meaning of a patient identifier 116, providing a mechanism to assess the likelihood of correct identification or the risk of misidentification. This process helps in refining the dataset by filtering out identifiers that may not meet a threshold of contextual clarity or relevance, thereby enhancing the overall quality of patient information management. Processor 104 set a predetermined threshold based on the needs of the system and the desired level of data integrity. Identifiers with scores above a certain threshold may be considered accurately contextualized, while those below the threshold might be considered a potential false positive patient identifier 136. Based the proximity to the threshold, patient identifiers 116 may then be filtered according to their context scores 132. Identifiers that meet or exceed the predefined score thresholds may be retained. While identifiers with scores below the threshold can be flagged for manual review, corrected, or excluded from certain processes to prevent potential errors in patient data management.

With continued reference to FIG. 1, processor 104 may be configured to generate a plurality of anonymized data 140 as a function of the plurality of patient identifiers 116 and the one or more false positive patient identifiers 136. As used in the current disclosure, "anonymized data" refers to patient identifiers that have been modified or disguised in a way that makes it impossible or impractical to identify the user, while still retaining its usability for specific purposes. As used in the current disclosure, "anonymized metadata" is metadata with each of the patient identifiers obfuscated. The patient identifiers 116 that are anonymized do not include false positive patient identifiers 136 that have been previously filtered out. Processor 104 may be configured to anonymize each patient identifier 116 within the metadata 112 and the user data 108 to generate anonymized data 140 and anonymized metadata, respectively. This may include redacting the patient identifiers 116 within the user data 108 and/or metadata 112. Redacting may be done using various methods like blacking out, using placeholders, or applying software tools to mask or replace the sensitive data. In an embodiment, this may involve removing or replacing patient identifiers 116 with pseudonyms and/or generic terms. In an embodiment, any method or procedure for creating anonymized data 140 may be used for creating anonymized metadata. Anonymized data may be the same or substantially similar to anonymized data disclosed in U.S. Nonprovisional patent application Ser. No. 18/385,057, filed on Oct. 30, 2023, and titled "APPARATUS AND A METHOD FOR ANONYMIZING USER DATA," which is incorporated by reference herein in its entirety.

With continued reference to FIG. 1, anonymized data 140 and/or anonymized metadata may include tokenizing the plurality of patient identifiers 116. As used in the current disclosure, "tokenization" is a process where sensitive data elements are replaced with unique tokens or references. Tokenization may rely on a secure mapping or lookup table that links tokens to original data, but this mapping is kept separate and secure. Tokenization of patient identifier 116 may use alphanumeric codes to replace names, geographic locations, temporal data, and the like. In a non-limiting example, a patient identifier 116 associated with a user's name may be replaced by the alphanumeric code of TKN-9876.

With continued reference to FIG. 1, anonymized data 140 and/or anonymized metadata may be done using an aggregation technique to obfuscate the PII. As used in the current disclosure, an "aggregation technique" is a technique used for anonymizing and summarizing information in a way that conceals individual-level details while still providing valuable insights at a higher level of abstraction. An aggregation technique may involve grouping the data into categories or clusters based on common attributes, such as age, location, or other relevant factors. In a non-limiting example, a patient identifier 116 that indicates the user's age of 34 may be aggregated to provide that the user is between the ages of 30-40. In another embodiment, aggregating the patient identifier 116 may include sorting patients into groups of similarly situated patients. They may be similarly situated by demographic factors, symptoms, diagnosis, prognosis, test results, and the like. The patient identifiers 116 of the group may be aggregated for each category, condition, symptom. Common statistical measures may be implemented to provide greater insights into the aggregated data. This may include averages, counts, percentages, mean, median, mode, or other statical measures. In a non-limiting example, a medical test result for five patients with who share the same condition may be anonymized by providing the average score among the five patients. The process of combining and summarizing data to create statistical or summary information, thus protecting the privacy of individual data subjects. In another non-limiting example, instead of reporting individual cholesterol levels for patients, an obfuscation process might provide the average cholesterol level for a group of patients within a certain age range. Additionally, generating anonymized data 140 and/or anonymized metadata may involve generalizing the patient identifiers 116. Generalization may involve replacing specific data points with more generalized categories or ranges. In a non-limiting example, instead of listing the exact age of a patient, processor 104 might categorize them as "under 18," "18-65," or "65 and older."

With continued reference to FIG. 1, processor 104 may obfuscate medical images with serial numbers. This may include sequencing the serial numbers using hash algorithms. An obfuscated set of serial numbers can be an ordered set of integers. The purpose of this process is to create an ordered sequence of serial numbers from a potentially unorganized set of data. Each item in the dataset may be a assigned a unique serial number. If the items don't have serial numbers already, the processor may assign them or ensure they are readily identifiable in the dataset. The processor may select an appropriate hashing algorithm. Hashing algorithms take an input (in this case, the serial numbers) and produce a fixed-length string of characters, which is typically a hexadecimal or binary representation. Hashing algorithms are described in greater detail herein below. The processor 104 may then apply the chosen hashing algorithm to each serial number. This means that it may process each serial number through the algorithm, and the result is a hash value for each serial number. The hash values may be compared to determine their relative order. The processor may then sort the items based on their hash values. This sorting can be done in ascending or descending order, depending on the desired sequence. The sorted order of items based on their hash values becomes the sequence of serial numbers. This sequence can be stored or used for various purposes, such as data organization, indexing, or identifying items in a specific order.

With continued reference to FIG. 1, obfuscating medical images may include data compression and processing techniques exemplified by the utilization of Vector Quantized Generative Adversarial Network (VQGAN) autoencoders. VQGAN may compress images in a form that significantly enhances the efficiency and performance of subsequent processing, particularly with transformer model architectures. For instance, VQGAN can compress a 384×384 image into a 96×96×3 codebook representation, where the codebook consists of a predefined set of vectors. This not only achieves a considerable reduction in dimensionality but also transforms the image data into a rich, structured format that transformers can process more effectively. The approach leverages the strengths of transformers in handling sequential data, applying it to the spatially rich data contained in images. By converting images into a compact, information-dense format, VQGAN facilitates a more nuanced and powerful analysis of visual data. This capability is especially relevant in medical imaging, where the ability to efficiently process and analyze high-resolution images can lead to better diagnostic accuracy and patient outcomes.

With continued reference to FIG. 1, processor 104 may generate anonymized data 140 and/or anonymized metadata using a cryptographic system to encrypt the patient identifiers 116. In one embodiment, a cryptographic system is a system that converts data from a first form, known as "plaintext," which is intelligible when viewed in its intended format, into a second form, known as "ciphertext," which is not intelligible when viewed in the same way. Ciphertext may be unintelligible in any format unless first converted back to plaintext. In one embodiment, a process of converting plaintext into ciphertext is known as "encryption." Encryption process may involve the use of a datum, known as an "encryption key," to alter plaintext. Cryptographic system may also convert ciphertext back into plaintext, which is a process known as "decryption." Decryption process may involve the use of a datum, known as a "decryption key," to return the ciphertext to its original plaintext form. In embodiments of cryptographic systems that are "symmetric," decryption key is essentially the same as encryption key: possession of either key makes it possible to deduce the other key quickly without further secret knowledge. Encryption and decryption keys in symmetric cryptographic systems may be kept secret and shared only with persons or entities that the user of the cryptographic system wishes to be able to decrypt the ciphertext. One example of a symmetric cryptographic system is the Advanced Encryption Standard ("AES"), which arranges plaintext into matrices and then modifies the matrices through repeated permutations and arithmetic operations with an encryption key.

With continued reference to FIG. 1, in embodiments of cryptographic systems that are "asymmetric," either encryption or decryption key cannot be readily deduced without additional secret knowledge, even given the possession of a corresponding decryption or encryption key, respectively; a common example is a "public key cryptographic system," in which possession of the encryption key does not make it practically feasible to deduce the decryption key, so that the encryption key may safely be made available to the public. An example of a public key cryptographic system is RSA, in which an encryption key involves the use of numbers that are products of very large prime numbers, but a decryption key involves the use of those very large prime numbers, such that deducing the decryption key from the encryption key requires the practically infeasible task of computing the prime factors of a number which is the product of two very large prime numbers. Another example is elliptic curve cryptography, which relies on the fact that given two points P and Q on an elliptic curve over a finite field, and a definition for addition where A+B=−R, the point where a line connecting point A and point B intersects the elliptic curve, where "0," the identity, is a point at infinity in a projective plane containing the elliptic curve, finding a number k such that adding P to itself k times results in Q is computationally impractical, given correctly selected elliptic curve, finite field, and P and Q.

With continued reference to FIG. 1, in some embodiments, systems and methods described herein produce cryptographic hashes, also referred to by the equivalent shorthand term "hashes." A cryptographic hash, as used herein, is a mathematical representation of a lot of data, such as files or blocks in a block chain as described in further detail below; the mathematical representation is produced by a lossy "one-way" algorithm known as a "hashing algorithm." Hashing algorithm may be a repeatable process; that is, identical lots of data may produce identical hashes each time they are subjected to a particular hashing algorithm. Because hashing algorithm is a one-way function, it may be impossible to reconstruct a lot of data from a hash produced from the lot of data using the hashing algorithm. In the case of some hashing algorithms, reconstructing the full lot of data from the corresponding hash using a partial set of data from the full lot of data may be possible only by repeatedly guessing at the remaining data and repeating the hashing algorithm; it is thus computationally difficult if not infeasible for a single computer to produce the lot of data, as the statistical likelihood of correctly guessing the missing data may be extremely low. However, the statistical likelihood of a computer of a set of computers simultaneously attempting to guess the missing data within a useful timeframe may be higher, permitting mining protocols as described in further detail below.

With continued reference to FIG. 1, in an embodiment, hashing algorithm may demonstrate an "avalanche effect," whereby even extremely small changes to lot of data produce drastically different hashes. This may thwart attempts to avoid the computational work necessary to recreate a hash by simply inserting a fraudulent datum in data lot, enabling the use of hashing algorithms for "tamper-proofing" data such as data contained in an immutable ledger as described in further detail below. This avalanche or "cascade" effect may be evinced by various hashing processes; persons skilled in the art, upon reading the entirety of this disclosure, will be aware of various suitable hashing algorithms for purposes described herein. Verification of a hash corresponding to a lot of data may be performed by running the lot of data through a hashing algorithm used to produce the hash. Such verification may be computationally expensive, albeit feasible, potentially adding up to significant processing delays where repeated hashing, or hashing of large quantities of data, is required, for instance as described in further detail below. Examples of hashing programs include, without limitation, SHA256, a NIST standard; further current and past hashing algorithms include Winternitz hashing algorithms, various generations of Secure Hash Algorithm (including "SHA-1," "SHA-2," and "SHA-3"), "Message Digest" family hashes such as "MD4," "MD5," "MD6," and "RIPEMD," Keccak, "BLAKE" hashes and progeny (e.g., "BLAKE2," "BLAKE-256," "BLAKE-512," and the like), Message Authentication Code ("MAC")-family hash functions such as PMAC, OMAC, VMAC, HMAC, and UMAC, Poly 1305-AES, Elliptic Curve Only Hash ("ECOH") and similar hash functions, Fast-Syndrome-based (FSB) hash functions, GOST hash functions, the Grøstl hash function, the HAS-160 hash function, the JH hash function, the RadioGatun hash function, the Skein hash function, the Streebog hash function, the SWIFFT hash function, the Tiger hash function, the Whirlpool hash function, or any hash function that satisfies, at the time of implementation, the requirements that a cryptographic hash be deterministic, infeasible to reverse-hash, infeasible to find collisions, and have the property that small changes to an original message to be hashed will change the resulting hash so extensively that the original hash and the new hash appear uncorrelated to each other. A degree of security of a hash function in practice may depend both on the hash function itself and on characteristics of the message and/or digest used in the hash function. For example, where a message is random, for a hash function that fulfills collision-resistance requirements, a brute-force or "birthday attack" may to detect collision may be on the order of $O(2^{n/2})$ for n output bits; thus, it may take on the order of $2^{256}$ operations to locate a collision in a 512 bit output "Dictionary" attacks on hashes likely to have been generated from a non-random original text can have a lower computational complexity, because the space of entries they are guessing is far smaller than the space containing all random permutations of bits. However, the space of possible messages may be augmented by increasing the length or potential length of a possible message, or by implementing a protocol whereby one or more randomly selected strings or sets of data are added to the message, rendering a dictionary attack significantly less effective.

Continuing to refer to FIG. 1, a "secure proof," as used in this disclosure, is a protocol whereby an output is generated that demonstrates possession of a secret, such as device-specific secret, without demonstrating the entirety of the device-specific secret; in other words, a secure proof by itself, is insufficient to reconstruct the entire device-specific secret, enabling the production of at least another secure proof using at least a device-specific secret. A secure proof may be referred to as a "proof of possession" or "proof of knowledge" of a secret. Where at least a device-specific secret is a plurality of secrets, such as a plurality of challenge-response pairs, a secure proof may include an output that reveals the entirety of one of the plurality of secrets, but not all of the plurality of secrets; for instance, secure proof may be a response contained in one challenge-response pair. In an embodiment, proof may not be secure; in other words, proof may include a one-time revelation of at least a device-specific secret, for instance as used in a single challenge-response exchange.

With continued reference to FIG. 1, secure proof may include a zero-knowledge proof, which may provide an output demonstrating possession of a secret while revealing none of the secret to a recipient of the output; zero-knowledge proof may be information-theoretically secure, meaning that an entity with infinite computing power would be unable to determine secret from output. Alternatively, zero-knowledge proof may be computationally secure, meaning that determination of secret from output is computationally infeasible, for instance to the same extent that determination of a private key from a public key in a public key cryptographic system is computationally infeasible. Zero-knowledge proof algorithms may generally include a set of two algorithms, a prover algorithm, or "P," which is used to prove computational integrity and/or possession of a secret, and a verifier algorithm, or "V" whereby a party may check the validity of P. Zero-knowledge proof may include an interactive zero-knowledge proof, wherein a party verifying the proof must directly interact with the proving party; for instance, the verifying and proving parties may be required to be online, or connected to the same network as each other, at the same time. Interactive zero-knowledge proof may include a "proof of knowledge" proof, such as a Schnorr algorithm for proof on knowledge of a discrete logarithm, in a Schnorr algorithm, a prover commits to a randomness r, generates a message based on r, and generates a message adding r to a challenge c multiplied by a discrete logarithm that the prover is able to calculate; verification is performed by the verifier who produced c by exponentiation, thus checking the validity of the discrete logarithm. Interactive zero-knowledge proofs may alternatively or additionally include sigma protocols. Persons skilled in the art, upon reviewing the entirety of this disclosure, will be aware of various alternative interactive zero-knowledge proofs that may be implemented consistently with this disclosure.

With continued reference to FIG. 1, alternatively, zero-knowledge proof may include a non-interactive zero-knowledge, proof, or a proof wherein neither party to the proof interacts with the other party to the proof; for instance, each of a party receiving the proof and a party providing the proof may receive a reference datum which the party providing the proof may modify or otherwise use to perform the proof. As a non-limiting example, zero-knowledge proof may include a succinct non-interactive arguments of knowledge (ZK-SNARKS) proof, wherein a "trusted setup" process creates proof and verification keys using secret (and subsequently discarded) information encoded using a public key cryptographic system, a prover runs a proving algorithm using the proving key and secret information available to the prover, and a verifier checks the proof using the verification key; public key cryptographic system may include RSA, elliptic curve cryptography, ElGamal, or any other suitable public key cryptographic system. Generation of trusted setup may be performed using a secure multiparty computation so that no one party has control of the totality of the secret information used in the trusted setup; as a result, if any one party generating the trusted setup is trustworthy, the secret information may be unrecoverable by malicious parties. As another non-limiting example, non-interactive zero-knowledge proof may include a Succinct Transparent Arguments of Knowledge (ZK-STARKS) zero-knowledge proof. In an embodiment, a ZK-STARKS proof includes a Merkle root of a Merkle tree representing evaluation of a secret computation at some number of points, which may be 1 billion points, plus Merkle branches representing evaluations at a set of randomly selected points of the number of points; verification may include determining that Merkle branches provided match the Merkle root, and that point verifications at those branches represent valid values, where validity is shown by demonstrating that all values belong to the same polynomial created by transforming the secret computation. In an embodiment, ZK-STARKS does not require a trusted setup.

With continued reference to FIG. 1, a zero-knowledge proof may include any other suitable zero-knowledge proof. Zero-knowledge proof may include, without limitation, bulletproofs. Zero-knowledge proof may include a homomorphic public-key cryptography (hPKC)-based proof. Zero-knowledge proof may include a discrete logarithmic problem (DLP) proof. Zero-knowledge proof may include a secure multi-party computation (MPC) proof. Zero-knowledge proof may include, without limitation, an incrementally verifiable computation (IVC). Zero-knowledge proof may include an interactive oracle proof (IOP). Zero-knowledge proof may include a proof based on the probabilistically checkable proof (PCP) theorem, including a linear PCP (LPCP) proof. Persons skilled in the art, upon reviewing the entirety of this disclosure, will be aware of various forms of zero-knowledge proofs that may be used, singly or in combination, consistently with this disclosure.

With continued reference to FIG. 1, in an embodiment, secure proof is implemented using a challenge-response protocol. In an embodiment, this may function as a one-time pad implementation; for instance, a manufacturer or other trusted party may record a series of outputs ("responses") produced by a device possessing secret information, given a series of corresponding inputs ("challenges"), and store them securely. In an embodiment, a challenge-response protocol may be combined with key generation. A single key may be used in one or more digital signatures as described in further detail below, such as signatures used to receive and/or transfer possession of crypto-currency assets; the key may be discarded for future use after a set period of time. In an embodiment, varied inputs include variations in local physical parameters, such as fluctuations in local electromagnetic fields, radiation, temperature, and the like, such that an almost limitless variety of private keys may be so generated. Secure proof may include encryption of a challenge to produce the response, indicating possession of a secret key. Encryption may be performed using a private key of a public key cryptographic system, or using a private key of a symmetric cryptographic system; for instance, trusted party may verify response by decrypting an encryption of challenge or of another datum using either a symmetric or public-key cryptographic system, verifying that a stored key matches the key used for encryption as a function of at least a device-specific secret. Keys may be generated by random variation in selection of prime numbers, for instance for the purposes of a cryptographic system such as RSA that relies prime factoring difficulty. Keys may be generated by randomized selection of parameters for a seed in a cryptographic system, such as elliptic curve cryptography, which is generated from a seed. Keys may be used to generate exponents for a cryptographic system such as Diffie-Helman or ElGamal that are based on the discrete logarithm problem.

With continued reference to FIG. 1, a "digital signature," as used herein, includes a secure proof of possession of a secret by a signing device, as performed on provided element of data, known as a "message." A message may include an encrypted mathematical representation of a file or other set of data using the private key of a public key cryptographic system. Secure proof may include any form of secure proof as described above, including without limitation encryption using a private key of a public key cryptographic system as described above. Signature may be verified using a verification datum suitable for verification of a secure proof; for instance, where secure proof is enacted by encrypting message using a private key of a public key cryptographic system, verification may include decrypting the encrypted message using the corresponding public key and comparing the decrypted representation to a purported match that was not encrypted; if the signature protocol is well-designed and implemented correctly, this means the ability to create the digital signature is equivalent to possession of the private decryption key and/or device-specific secret. Likewise, if a message making up a mathematical representation of file is well-designed and implemented correctly, any alteration of the file may result in a mismatch with the digital signature; the mathematical representation may be produced using an alteration-sensitive, reliably reproducible algorithm, such as a hashing algorithm as described above. A mathematical representation to which the signature may be compared may be included with signature, for verification purposes; in other embodiments, the algorithm used to produce the mathematical representation may be publicly available, permitting the easy reproduction of the mathematical representation corresponding to any file.

Still viewing FIG. 1, in some embodiments, digital signatures may be combined with or incorporated in digital certificates. In one embodiment, a digital certificate is a file that conveys information and links the conveyed information to a "certificate authority" that is the issuer of a public key in a public key cryptographic system. Certificate authority in some embodiments contains data conveying the certificate authority's authorization for the recipient to perform a task. The authorization may be the authorization to access a given datum. The authorization may be the authorization to access a given process. In some embodiments, the certificate may identify the certificate authority. The digital certificate may include a digital signature.

With continued reference to FIG. 1, in some embodiments, a third party such as a certificate authority (CA) is available to verify that the possessor of the private key is a particular entity; thus, if the certificate authority may be trusted, and the private key has not been stolen, the ability of an entity to produce a digital signature confirms the identity of the entity and links the file to the entity in a verifiable way. Digital signature may be incorporated in a digital certificate, which is a document authenticating the entity possessing the private key by authority of the issuing certificate authority and signed with a digital signature created with that private key and a mathematical representation of the remainder of the certificate. In other embodiments, digital signature is verified by comparing the digital signature to one known to have been created by the entity that purportedly signed the digital signature; for instance, if the public key that decrypts the known signature also decrypts the digital signature, the digital signature may be considered verified. Digital signature may also be used to verify that the file has not been altered since the formation of the digital signature.

With continued reference to FIG. 1, processor 104 may generate anonymized data 140 using an anonymization machine-learning model. As used in the current disclosure, an "anonymization machine-learning model" is a machine-learning model that is configured to generate anonymized data 140 and/or anonymized metadata. An anonymization machine-learning model may be consistent with the machine-learning model described below in FIG. 2. Inputs to the anonymization machine-learning model may include user data 108, metadata 112, plurality of patient identifiers 116, contextual data 120, composite terms 124, context scores 132, examples of anonymized data 140, examples of anonymized metadata, and the like. Outputs to the anonymization machine-learning model may include anonymized data 140 and/or anonymized metadata tailored to the plurality of patient identifiers 116. Anonymization training data may include a plurality of data entries containing a plurality of inputs that are correlated to a plurality of outputs for training a processor by a machine-learning process. In an embodiment, anonymization training data may include a plurality of plurality of patient identifiers 116 correlated to examples of anonymized data 140. Alternatively, anonymization training data may include a plurality of plurality of patient identifiers 116 correlated to examples of anonymized metadata. Anonymization training data may be received from database. Anonymization training data may contain information about user data 108, metadata 112, plurality of patient identifiers 116, contextual data 120, composite terms 124, context scores 132, examples of anonymized data 140, examples of anonymized metadata, and the like. In an embodiment, anonymization training data may be iteratively updated as a function of the input and output results of past anonymization machine-learning model or any other machine-learning model mentioned throughout this disclosure. The machine-learning model may be performed using, without limitation, linear machine-learning models such as without limitation logistic regression and/or naive Bayes machine-learning models, nearest neighbor machine-learning models such as k-nearest neighbors machine-learning models, support vector machines, least squares support vector machines, fisher's linear discriminant, quadratic machine-learning models, decision trees, boosted trees, random forest machine-learning model, and the like.

With continued reference to FIG. 1, processor 104 may be configured to update the training data of the anonymization machine-learning model using user inputs. An anonymization machine-learning model may use user input to update its training data, thereby improving its performance and accuracy. In embodiments, the anonymization machine-learning model may be iteratively updated using input and output results of past iterations of the anonymization machine-learning model. The anonymization machine-learning model may then be iteratively retrained using the updated anonymization training data. For instance, and without limitation, anonymization machine-learning model may be trained using anonymization training data from training data from a user input or database. The anonymization training data may then be updated by using previous inputs and outputs from the anonymization machine-learning model as second iteration of anonymization training data. This may be used to retrain the anonymization machine-learning model. This process of updating the anonymization machine-learning model and its associated training data may be continuously done to create improved versions of the anonymization machine-learning model. Improvements may include improvements to the speed and accuracy of the anonymization machine-learning model. When users interact with the software, their actions, preferences, and feedback provide valuable information that can be used to refine and enhance the model. This user input is collected and incorporated into the training data, allowing the machine learning model to learn from real-world interactions and adapt its predictions accordingly. By continually incorporating user input, the model becomes more responsive to user needs and preferences, capturing evolving trends and patterns. This iterative process of updating the training data with user input enables the machine learning model to deliver more personalized and relevant results, enhancing the overall user experience. The discussion within this paragraph may apply to both the anonymization machine-learning model or any other machine-learning model/classifier discussed herein.

Still referring to FIG. 1, processor 104 may be configured to display user data 108 that includes anonymized patient identifiers 116 on a display device 144. As used in the current disclosure, a "display device" is a device that is used to display content. A display device 144 may include a user interface. A "user interface," as used herein, is a means by which a user and a computer system interact; for example through the use of input devices and software. A user interface may include a graphical user interface (GUI), command line interface (CLI), menu-driven user interface, touch user interface, voice user interface (VUI), form-based user interface, any combination thereof, and the like. A user interface may include a smartphone, smart tablet, desktop, or laptop operated by the user. In an embodiment, the user interface may include a graphical user interface. A "graphical user interface (GUI)," as used herein, is a graphical form of user interface that allows users to interact with electronic devices. In some embodiments, GUI may include icons, menus, other visual indicators, or representations (graphics), audio indicators such as primary notation, and display information and related user controls. A menu may contain a list of choices and may allow users to select one from them. A menu bar may be displayed horizontally across the screen such as pull-down menu. When any option is clicked in this menu, then the pull-down menu may appear. A menu may include a context menu that appears only when the user performs a specific action. An example of this is pressing the right mouse button. When this is done, a menu may appear under the cursor. Files, programs, web pages and the like may be represented using a small picture in a graphical user interface. For example, links to decentralized platforms as described in this disclosure may be incorporated using icons. Using an icon may be a fast way to open documents, run programs etc. because clicking on them yields instant access. Information contained in user interface may be directly influenced using graphical control elements such as widgets. A "widget," as used herein, is a user control element that allows a user to control and change the appearance of elements in the user interface. In this context a widget may refer to a generic GUI element such as a check box, button, or scroll bar to an instance of that element, or to a customized collection of such elements used for a specific function or application (such as a dialog box for users to customize their computer screen appearances). User interface controls may include software components that a user interacts with through direct manipulation to read or edit information displayed through user interface. Widgets may be used to display lists of related items, navigate the system using links, tabs, and manipulate data using check boxes, radio boxes, and the like.

Figure 2:
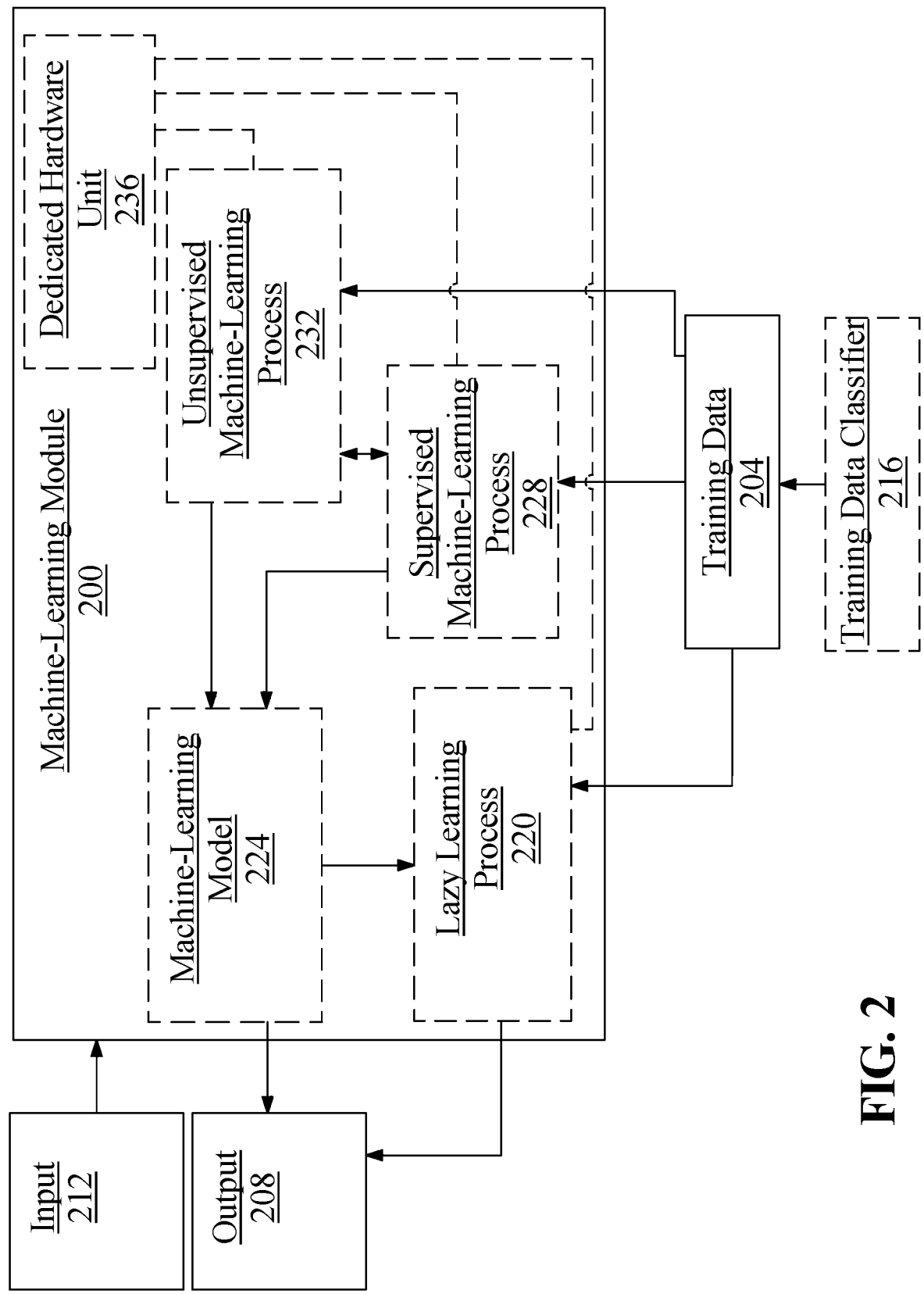
FIG. 2 is a block diagram of an exemplary machine-learning process.

Referring now to FIG. 2, an exemplary embodiment of a machine-learning module 200 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 204 to generate an algorithm instantiated in hardware or software logic, data structures, and/or functions that will be performed by a computing device/module to produce outputs 208 given data provided as inputs 212; this is in contrast to a non-machine learning software program where the commands to be executed are determined in advance by a user and written in a programming language.

Still referring to FIG. 2, "training data," as used herein, is data containing correlations that a machine-learning process may use to model relationships between two or more categories of data elements. For instance, and without limitation, training data 204 may include a plurality of data entries, also known as "training examples," each entry representing a set of data elements that were recorded, received, and/or generated together; data elements may be correlated by shared existence in a given data entry, by proximity in a given data entry, or the like. Multiple data entries in training data 204 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 204 according to various correlations; correlations may indicate causative and/or predictive links between categories of data elements, which may be modeled as relationships such as mathematical relationships by machine-learning processes as described in further detail below. Training data 204 may be formatted and/or organized by categories of data elements, for instance by associating data elements with one or more descriptors corresponding to categories of data elements. As a non-limiting example, training data 204 may include data entered in standardized forms by persons or processes, such that entry of a given data element in a given field in a form may be mapped to one or more descriptors of categories. Elements in training data 204 may be linked to descriptors of categories by tags, tokens, or other data elements; for instance, and without limitation, training data 204 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 2, training data 204 may include one or more elements that are not categorized; that is, training data 204 may not be formatted or contain descriptors for some elements of data. Machine-learning algorithms and/or other processes may sort training data 204 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 204 to be made applicable for two or more distinct machine-learning algorithms as described in further detail below. Training data 204 used by machine-learning module 200 may correlate any input data as described in this disclosure to any output data as described in this disclosure. As a non-limiting illustrative example, patient identifiers 116 correlated to examples of contextual data 120.

Further referring to FIG. 2, training data may be filtered, sorted, and/or selected using one or more supervised and/or unsupervised machine-learning processes and/or models as described in further detail below; such models may include without limitation a training data classifier 216. Training data classifier 216 may include a "classifier," which as used in this disclosure is a machine-learning model as defined below, such as a data structure representing and/or using a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. A distance metric may include any norm, such as, without limitation, a Pythagorean norm. Machine-learning module 200 may generate a classifier using a classification algorithm, defined as a processes whereby a computing device and/or any module and/or component operating thereon derives a classifier from training data 204. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 216 may classify elements of training data to composite terms 124 relating to one or more known medical terms.

With further reference to FIG. 2, training examples for use as training data may be selected from a population of potential examples according to cohorts relevant to an analytical problem to be solved, a classification task, or the like. Alternatively or additionally, training data may be selected to span a set of likely circumstances or inputs for a machine-learning model and/or process to encounter when deployed. For instance, and without limitation, for each category of input data to a machine-learning process or model that may exist in a range of values in a population of phenomena such as images, user data, process data, physical data, or the like, a computing device, processor, and/or machine-learning model may select training examples representing each possible value on such a range and/or a representative sample of values on such a range. Selection of a representative sample may include selection of training examples in proportions matching a statistically determined and/or predicted distribution of such values according to relative frequency, such that, for instance, values encountered more frequently in a population of data so analyzed are represented by more training examples than values that are encountered less frequently. Alternatively or additionally, a set of training examples may be compared to a collection of representative values in a database and/or presented to a user, so that a process can detect, automatically or via user input, one or more values that are not included in the set of training examples. Computing device, processor, and/or module may automatically generate a missing training example; this may be done by receiving and/or retrieving a missing input and/or output value and correlating the missing input and/or output value with a corresponding output and/or input value collocated in a data record with the retrieved value, provided by a user and/or other device, or the like.

Still referring to FIG. 2, computer, processor, and/or module may be configured to sanitize training data. "Sanitizing" training data, as used in this disclosure, is a process whereby training examples are removed that interfere with convergence of a machine-learning model and/or process to a useful result. For instance, and without limitation, a training example may include an input and/or output value that is an outlier from typically encountered values, such that a machine-learning algorithm using the training example will be adapted to an unlikely amount as an input and/or output; a value that is more than a threshold number of standard deviations away from an average, mean, or expected value, for instance, may be eliminated. Alternatively or additionally, one or more training examples may identify as having poor quality data, where "poor quality" is defined as having a signal to noise ratio below a threshold value.

As a non-limiting example, and with further reference to FIG. 2, images used to train an image classifier or other machine-learning model and/or process that takes images as inputs or generates images as outputs may be rejected if image quality is below a threshold value. For instance, and without limitation, computing device, processor, and/or module may perform blur detection, and eliminate one or more Blur detection may be performed, as a non-limiting example, by taking Fourier transform, or an approximation such as a Fast Fourier Transform (FFT) of the image and analyzing a distribution of low and high frequencies in the resulting frequency-domain depiction of the image; numbers of high-frequency values below a threshold level may indicate blurriness. As a further non-limiting example, detection of blurriness may be performed by convolving an image, a channel of an image, or the like with a Laplacian kernel; this may generate a numerical score reflecting a number of rapid changes in intensity shown in the image, such that a high score indicates clarity, and a low score indicates blurriness. Blurriness detection may be performed using a gradient-based operator, which measures operators based on the gradient or first derivative of an image, based on the hypothesis that rapid changes indicate sharp edges in the image, and thus are indicative of a lower degree of blurriness. Blur detection may be performed using Wavelet-based operator, which takes advantage of the capability of coefficients of the discrete wavelet transform to describe the frequency and spatial content of images. Blur detection may be performed using statistics-based operators take advantage of several image statistics as texture descriptors in order to compute a focus level. Blur detection may be performed by using discrete cosine transform (DCT) coefficients in order to compute a focus level of an image from its frequency content.

Continuing to refer to FIG. 2, computing device, processor, and/or module may be configured to precondition one or more training examples. For instance, and without limitation, where a machine learning model and/or process has one or more inputs and/or outputs requiring, transmitting, or receiving a certain number of bits, samples, or other units of data, one or more training examples' elements to be used as or compared to inputs and/or outputs may be modified to have such a number of units of data. For instance, a computing device, processor, and/or module may convert a smaller number of units, such as in a low pixel count image, into a desired number of units, for instance by upsampling and interpolating. As a non-limiting example, a low pixel count image may have 100 pixels, however a desired number of pixels may be 128. Processor may interpolate the low pixel count image to convert the 100 pixels into 128 pixels. It should also be noted that one of ordinary skill in the art, upon reading this disclosure, would know the various methods to interpolate a smaller number of data units such as samples, pixels, bits, or the like to a desired number of such units. In some instances, a set of interpolation rules may be trained by sets of highly detailed inputs and/or outputs and corresponding inputs and/or outputs downsampled to smaller numbers of units, and a neural network or other machine learning model that is trained to predict interpolated pixel values using the training data. As a non-limiting example, a sample input and/or output, such as a sample picture, with sample-expanded data units (e.g., pixels added between the original pixels) may be input to a neural network or machine-learning model and output a pseudo replica sample-picture with dummy values assigned to pixels between the original pixels based on a set of interpolation rules. As a non-limiting example, in the context of an image classifier, a machine-learning model may have a set of interpolation rules trained by sets of highly detailed images and images that have been downsampled to smaller numbers of pixels, and a neural network or other machine learning model that is trained using those examples to predict interpolated pixel values in a facial picture context. As a result, an input with sample-expanded data units (the ones added between the original data units, with dummy values) may be run through a trained neural network and/or model, which may fill in values to replace the dummy values. Alternatively or additionally, processor, computing device, and/or module may utilize sample expander methods, a low-pass filter, or both. As used in this disclosure, a "low-pass filter" is a filter that passes signals with a frequency lower than a selected cutoff frequency and attenuates signals with frequencies higher than the cutoff frequency. The exact frequency response of the filter depends on the filter design. Computing device, processor, and/or module may use averaging, such as luma or chroma averaging in images, to fill in data units in between original data units.

In some embodiments, and with continued reference to FIG. 2, computing device, processor, and/or module may down-sample elements of a training example to a desired lower number of data elements. As a non-limiting example, a high pixel count image may have 256 pixels, however a desired number of pixels may be 128. Processor may downsample the high pixel count image to convert the 256 pixels into 128 pixels. In some embodiments, processor may be configured to perform downsampling on data. Downsampling, also known as decimation, may include removing every Nth entry in a sequence of samples, all but every Nth entry, or the like, which is a process known as "compression," and may be performed, for instance by an N-sample compressor implemented using hardware or software. Antialiasing and/or anti-imaging filters, and/or low-pass filters, may be used to clean up side effects of compression.

Still referring to FIG. 2, machine-learning module 200 may be configured to perform a lazy-learning process 220 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 204. Heuristic may include selecting some number of highest-ranking associations and/or training data 204 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 2, machine-learning processes as described in this disclosure may be used to generate machine-learning models 224. A "machine-learning model," as used in this disclosure, is a data structure representing and/or instantiating a mathematical and/or algorithmic representation of a relationship between inputs and outputs, as generated using any machine-learning process including without limitation any process as described above, and stored in memory; an input is submitted to a machine-learning model 224 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 224 may be generated by creating an artificial neural network, such as a convolutional neural network comprising an input layer of nodes, one or more intermediate layers, and an output layer of nodes. Connections between nodes may be created via the process of "training" the network, in which elements from a training data 204 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 2, machine-learning algorithms may include at least a supervised machine-learning process 228. At least a supervised machine-learning process 228, as defined herein, include algorithms that receive a training set relating a number of inputs to a number of outputs, and seek to generate one or more data structures representing and/or instantiating one or more mathematical relations relating inputs to outputs, where each of the one or more mathematical relations is optimal according to some criterion specified to the algorithm using some scoring function. For instance, a supervised learning algorithm may include patient identifiers 116 as described above as inputs, contextual data 120 as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 204. Persons skilled in the art, upon reviewing the entirety of this disclosure, will be aware of various possible variations of at least a supervised machine-learning process 228 that may be used to determine relation between inputs and outputs. Supervised machine-learning processes may include classification algorithms as defined above.

With further reference to FIG. 2, training a supervised machine-learning process may include, without limitation, iteratively updating coefficients, biases, weights based on an error function, expected loss, and/or risk function. For instance, an output generated by a supervised machine-learning model using an input example in a training example may be compared to an output example from the training example; an error function may be generated based on the comparison, which may include any error function suitable for use with any machine-learning algorithm described in this disclosure, including a square of a difference between one or more sets of compared values or the like. Such an error function may be used in turn to update one or more weights, biases, coefficients, or other parameters of a machine-learning model through any suitable process including without limitation gradient descent processes, least-squares processes, and/or other processes described in this disclosure. This may be done iteratively and/or recursively to gradually tune such weights, biases, coefficients, or other parameters. Updating may be performed, in neural networks, using one or more back-propagation algorithms. Iterative and/or recursive updates to weights, biases, coefficients, or other parameters as described above may be performed until currently available training data is exhausted and/or until a convergence test is passed, where a "convergence test" is a test for a condition selected as indicating that a model and/or weights, biases, coefficients, or other parameters thereof has reached a degree of accuracy. A convergence test may, for instance, compare a difference between two or more successive errors or error function values, where differences below a threshold amount may be taken to indicate convergence. Alternatively or additionally, one or more errors and/or error function values evaluated in training iterations may be compared to a threshold.

Still referring to FIG. 2, a computing device, processor, and/or module may be configured to perform method, method step, sequence of method steps and/or algorithm described in reference to this figure, in any order and with any degree of repetition. For instance, a computing device, processor, and/or module may be configured to perform a single step, sequence and/or algorithm repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. A computing device, processor, and/or module may perform any step, sequence of steps, or algorithm in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Further referring to FIG. 2, machine learning processes may include at least an unsupervised machine-learning processes 232. An unsupervised machine-learning process, as used herein, is a process that derives inferences in datasets without regard to labels; as a result, an unsupervised machine-learning process may be free to discover any structure, relationship, and/or correlation provided in the data. Unsupervised processes 232 may not require a response variable; unsupervised processes 232 may be used to find interesting patterns and/or inferences between variables, to determine a degree of correlation between two or more variables, or the like.

Still referring to FIG. 2, machine-learning module 200 may be designed and configured to create a machine-learning model 224 using techniques for development of linear regression models. Linear regression models may include ordinary least squares regression, which aims to minimize the square of the difference between predicted outcomes and actual outcomes according to an appropriate norm for measuring such a difference (e.g., a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 2, machine-learning algorithms may include, without limitation, linear discriminant analysis. Machine-learning algorithm may include quadratic discriminant analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes.

Still referring to FIG. 2, a machine-learning model and/or process may be deployed or instantiated by incorporation into a program, apparatus, system and/or module. For instance, and without limitation, a machine-learning model, neural network, and/or some or all parameters thereof may be stored and/or deployed in any memory or circuitry. Parameters such as coefficients, weights, and/or biases may be stored as circuit-based constants, such as arrays of wires and/or binary inputs and/or outputs set at logic "1" and "0" voltage levels in a logic circuit to represent a number according to any suitable encoding system including twos complement or the like or may be stored in any volatile and/or non-volatile memory. Similarly, mathematical operations and input and/or output of data to or from models, neural network layers, or the like may be instantiated in hardware circuitry and/or in the form of instructions in firmware, machine-code such as binary operation code instructions, assembly language, or any higher-order programming language. Any technology for hardware and/or software instantiation of memory, instructions, data structures, and/or algorithms may be used to instantiate a machine-learning process and/or model, including without limitation any combination of production and/or configuration of non-reconfigurable hardware elements, circuits, and/or modules such as without limitation ASICs, production and/or configuration of reconfigurable hardware elements, circuits, and/or modules such as without limitation FPGAs, production and/or of non-reconfigurable and/or configuration non-rewritable memory elements, circuits, and/or modules such as without limitation non-rewritable ROM, production and/or configuration of reconfigurable and/or rewritable memory elements, circuits, and/or modules such as without limitation rewritable ROM or other memory technology described in this disclosure, and/or production and/or configuration of any computing device and/or component thereof as described in this disclosure. Such deployed and/or instantiated machine-learning model and/or algorithm may receive inputs from any other process, module, and/or component described in this disclosure, and produce outputs to any other process, module, and/or component described in this disclosure.

Continuing to refer to FIG. 2, any process of training, retraining, deployment, and/or instantiation of any machine-learning model and/or algorithm may be performed and/or repeated after an initial deployment and/or instantiation to correct, refine, and/or improve the machine-learning model and/or algorithm. Such retraining, deployment, and/or instantiation may be performed as a periodic or regular process, such as retraining, deployment, and/or instantiation at regular elapsed time periods, after some measure of volume such as a number of bytes or other measures of data processed, a number of uses or performances of processes described in this disclosure, or the like, and/or according to a software, firmware, or other update schedule. Alternatively or additionally, retraining, deployment, and/or instantiation may be event-based, and may be triggered, without limitation, by user inputs indicating sub-optimal or otherwise problematic performance and/or by automated field testing and/or auditing processes, which may compare outputs of machine-learning models and/or algorithms, and/or errors and/or error functions thereof, to any thresholds, convergence tests, or the like, and/or may compare outputs of processes described herein to similar thresholds, convergence tests or the like. Event-based retraining, deployment, and/or instantiation may alternatively or additionally be triggered by receipt and/or generation of one or more new training examples; a number of new training examples may be compared to a preconfigured threshold, where exceeding the preconfigured threshold may trigger retraining, deployment, and/or instantiation.

Still referring to FIG. 2, retraining and/or additional training may be performed using any process for training described above, using any currently or previously deployed version of a machine-learning model and/or algorithm as a starting point. Training data for retraining may be collected, preconditioned, sorted, classified, sanitized, or otherwise processed according to any process described in this disclosure. Training data may include, without limitation, training examples including inputs and correlated outputs used, received, and/or generated from any version of any system, module, machine-learning model or algorithm, apparatus, and/or method described in this disclosure; such examples may be modified and/or labeled according to user feedback or other processes to indicate desired results, and/or may have actual or measured results from a process being modeled and/or predicted by system, module, machine-learning model or algorithm, apparatus, and/or method as "desired" results to be compared to outputs for training processes as described above.

Redeployment may be performed using any reconfiguring and/or rewriting of reconfigurable and/or rewritable circuit and/or memory elements; alternatively, redeployment may be performed by production of new hardware and/or software components, circuits, instructions, or the like, which may be added to and/or may replace existing hardware and/or software components, circuits, instructions, or the like.

Further referring to FIG. 2, one or more processes or algorithms described above may be performed by at least a dedicated hardware unit 236. A "dedicated hardware unit," for the purposes of this figure, is a hardware component, circuit, or the like, aside from a principal control circuit and/or processor performing method steps as described in this disclosure, that is specifically designated or selected to perform one or more specific tasks and/or processes described in reference to this figure, such as without limitation preconditioning and/or sanitization of training data and/or training a machine-learning algorithm and/or model. A dedicated hardware unit 236 may include, without limitation, a hardware unit that can perform iterative or massed calculations, such as matrix-based calculations to update or tune parameters, weights, coefficients, and/or biases of machine-learning models and/or neural networks, efficiently using pipelining, parallel processing, or the like; such a hardware unit may be optimized for such processes by, for instance, including dedicated circuitry for matrix and/or signal processing operations that includes, e.g., multiple arithmetic and/or logical circuit units such as multipliers and/or adders that can act simultaneously and/or in parallel or the like. Such dedicated hardware units 236 may include, without limitation, graphical processing units (GPUs), dedicated signal processing modules, FPGA or other reconfigurable hardware that has been configured to instantiate parallel processing units for one or more specific tasks, or the like, A computing device, processor, apparatus, or module may be configured to instruct one or more dedicated hardware units 236 to perform one or more operations described herein, such as evaluation of model and/or algorithm outputs, one-time or iterative updates to parameters, coefficients, weights, and/or biases, and/or any other operations such as vector and/or matrix operations as described in this disclosure.

Figure 3:
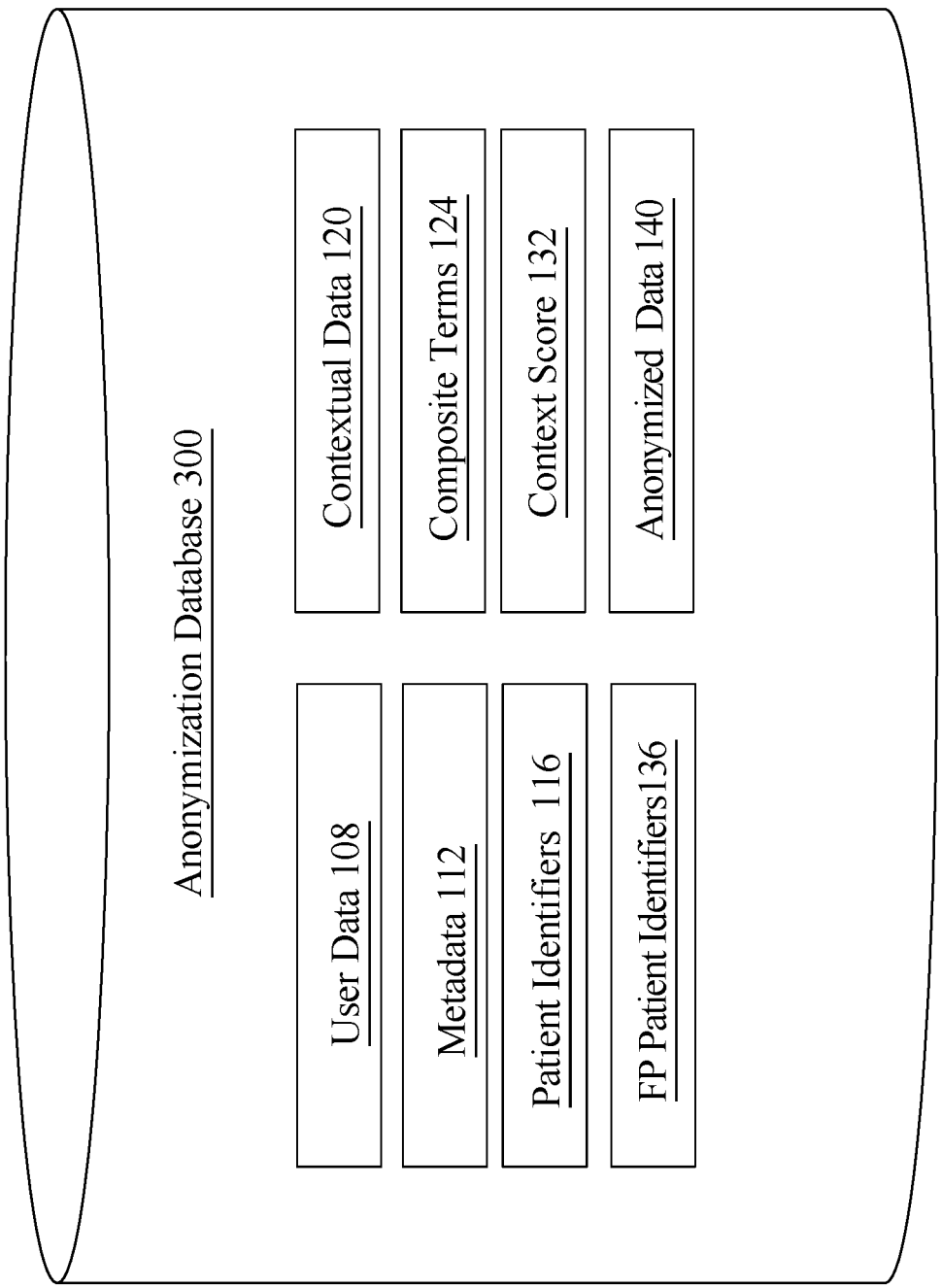
FIG. 3 is a block diagram of an exemplary embodiment of an anonymization database.

Now referring to FIG. 3, an exemplary anonymization database 300 is illustrated by way of block diagram. In an embodiment, any past or present versions of any data disclosed herein may be stored within the anonymization database 300 including but not limited to: user data 108, metadata 112, patient identifier 116, contextual data 120, composite terms 124, context score 132, false positive patient identifiers 136, anonymized data 140 and the like. Processor 104 may be communicatively connected with anonymization database 300. For example, in some cases, database 300 may be local to processor 104. Alternatively or additionally, in some cases, database 300 may be remote to processor 104 and communicative with processor 104 by way of one or more networks. Network may include, but not limited to, a cloud network, a mesh network, or the like. By way of example, a "cloud-based" system, as that term is used herein, can refer to a system which includes software and/or data which is stored, managed, and/or processed on a network of remote servers hosted in the "cloud," e.g., via the Internet, rather than on local severs or personal computers. A "mesh network" as used in this disclosure is a local network topology in which the infrastructure processor 104 connects directly, dynamically, and non-hierarchically to as many other computing devices as possible. A "network topology" as used in this disclosure is an arrangement of elements of a communication network, anonymization database 300 may be implemented, without limitation, as a relational database, a key-value retrieval database such as a NOSQL database, or any other format or structure for use as a database that a person skilled in the art would recognize as suitable upon review of the entirety of this disclosure. Anonymization database 300 may alternatively or additionally be implemented using a distributed data storage protocol and/or data structure, such as a distributed hash table or the like. Anonymization database 300 may include a plurality of data entries and/or records as described above. Data entries in a database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in a database may store, retrieve, organize, and/or reflect data and/or records as used herein, as well as categories and/or populations of data consistently with this disclosure.

Figure 4:
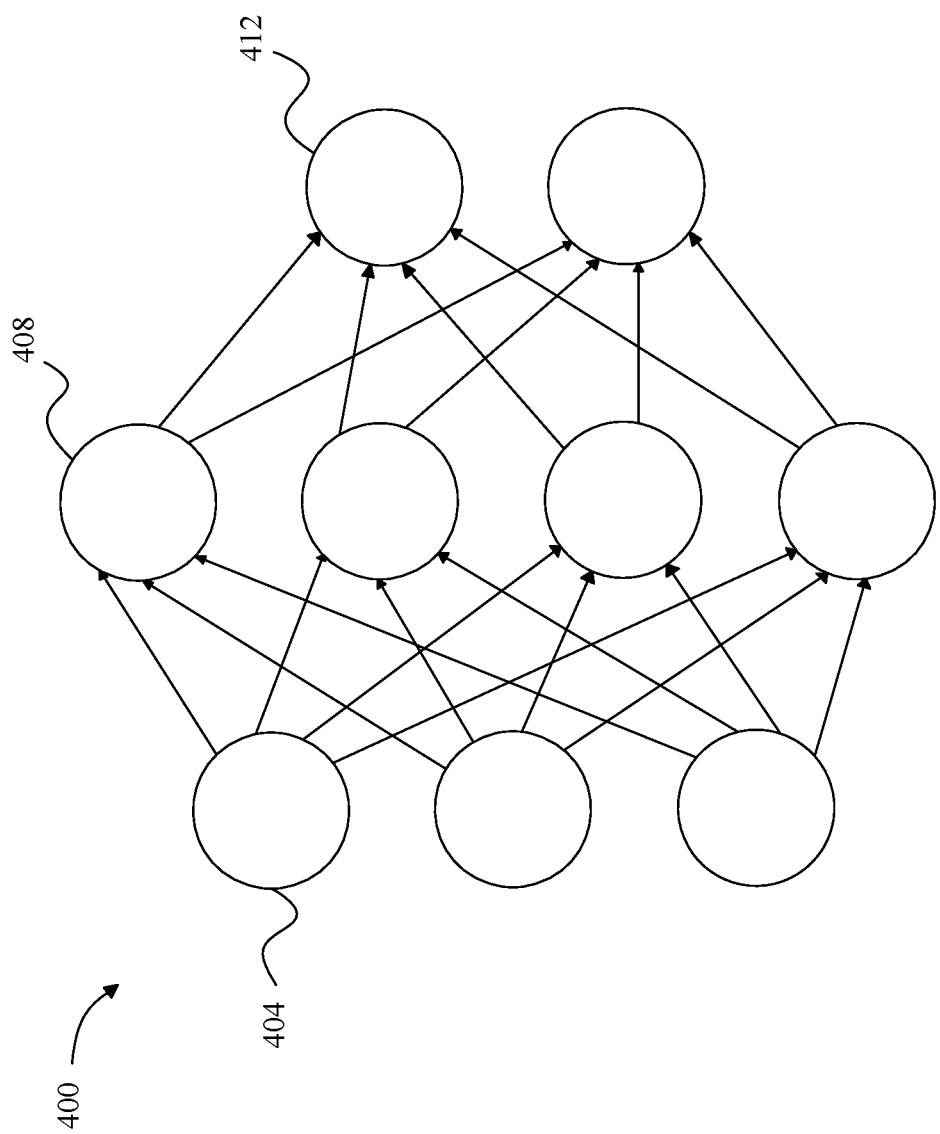
FIG. 4 is a diagram of an exemplary embodiment of a neural network.

Referring now to FIG. 4, an exemplary embodiment of neural network 400 is illustrated. A neural network 400, also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 404, one or more intermediate layers 408, and an output layer of nodes 412. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network or may feed outputs of one layer back to inputs of the same or a different layer in a "recurrent network." As a further non-limiting example, a neural network may include a convolutional neural network comprising an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

Figure 5:
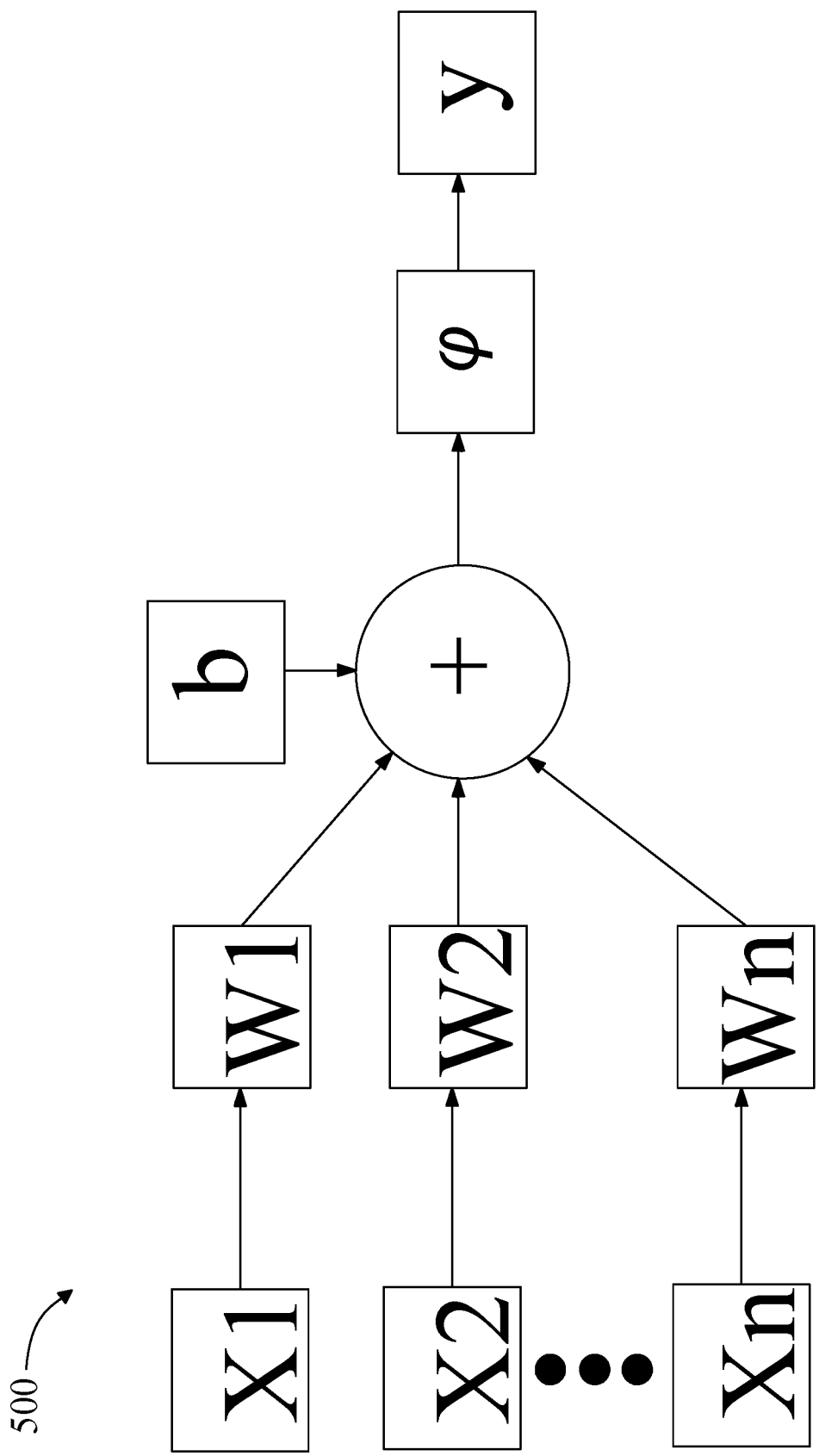
FIG. 5 is a diagram of an exemplary embodiment of a node of a neural network.

Referring now to FIG. 5, an exemplary embodiment of a node of a neural network is illustrated. A node may include, without limitation, a plurality of inputs $x_i$ that may receive numerical values from inputs to a neural network containing the node and/or from other nodes. Node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above.

Figure 6:
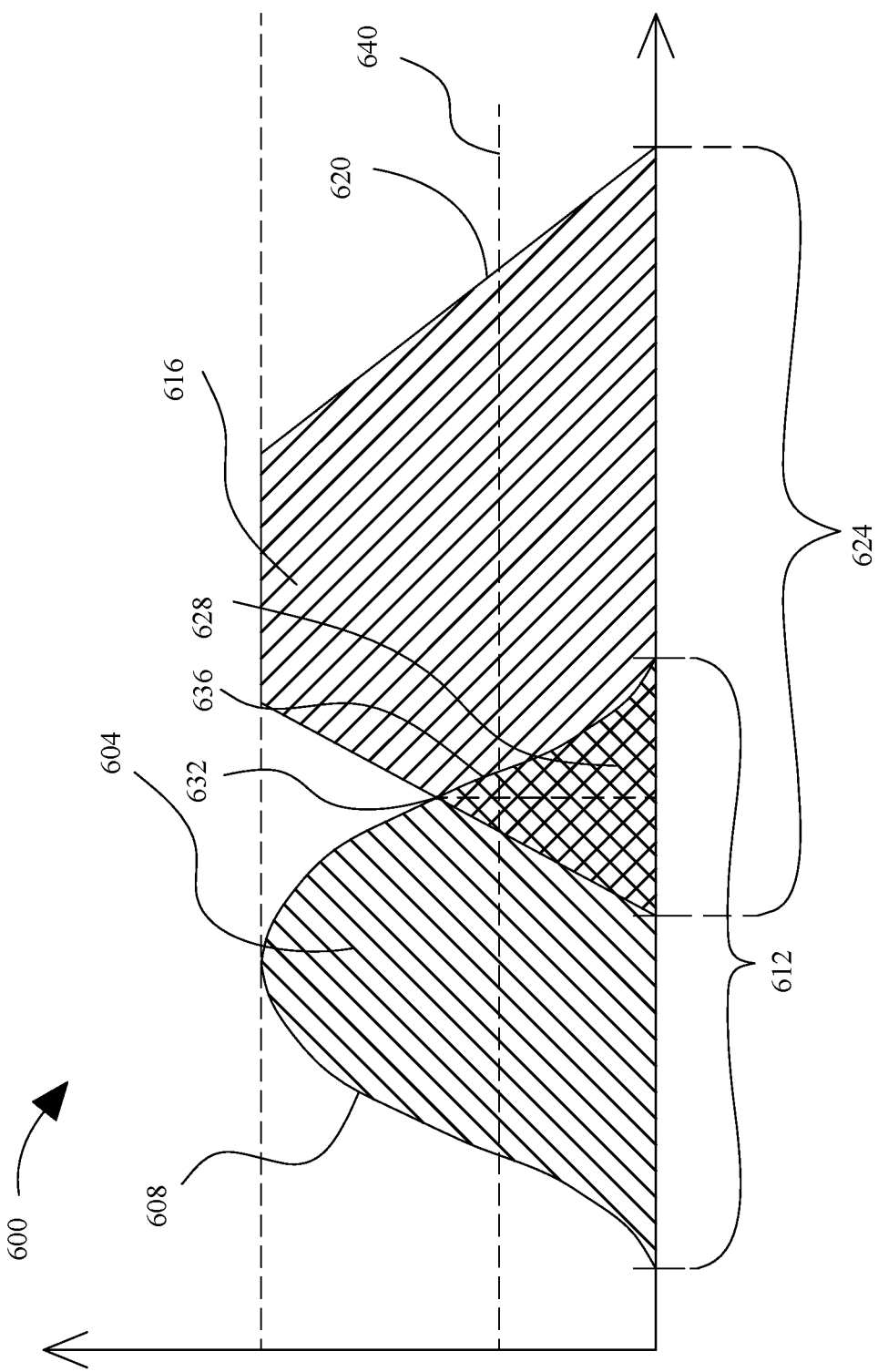
FIG. 6 is an illustration of an exemplary embodiment of fuzzy set comparison.

Now referring to FIG. 6, an exemplary embodiment of fuzzy set comparison 600 is illustrated. In a non-limiting embodiment, the fuzzy set comparison. In a non-limiting embodiment, fuzzy set comparison 600 may be consistent with fuzzy set comparison in FIG. 1. In another non-limiting the fuzzy set comparison 600 may be consistent with the name/version matching as described herein. For example and without limitation, the parameters, weights, and/or coefficients of the membership functions may be tuned using any machine-learning methods for the name/version matching as described herein. In another non-limiting embodiment, the fuzzy set may represent composite terms 124 and patient identifiers 116 from FIG. 1.

Alternatively or additionally, and still referring to FIG. 6, fuzzy set comparison 600 may be generated as a function of determining the data compatibility threshold. The compatibility threshold may be determined by a computing device. In some embodiments, a computing device may use a logic comparison program, such as, but not limited to, a fuzzy logic model to determine the compatibility threshold and/or version authenticator. Each such compatibility threshold may be represented as a value for a posting variable representing the compatibility threshold, or in other words a fuzzy set as described above that corresponds to a degree of compatibility and/or allowability as calculated using any statistical, machine-learning, or other method that may occur to a person skilled in the art upon reviewing the entirety of this disclosure. In some embodiments, determining the compatibility threshold and/or version authenticator may include using a linear regression model. A linear regression model may include a machine learning model. A linear regression model may map statistics such as, but not limited to, frequency of the same range of version numbers, and the like, to the compatibility threshold and/or version authenticator. In some embodiments, determining the compatibility threshold of any posting may include using a classification model. A classification model may be configured to input collected data and cluster data to a centroid based on, but not limited to, frequency of appearance of the range of versioning numbers, linguistic indicators of compatibility and/or allowability, and the like. Centroids may include scores assigned to them such that the compatibility threshold may each be assigned a score. In some embodiments, a classification model may include a K-means clustering model. In some embodiments, a classification model may include a particle swarm optimization model. In some embodiments, determining a compatibility threshold may include using a fuzzy inference engine. A fuzzy inference engine may be configured to map one or more compatibility threshold using fuzzy logic. In some embodiments, a plurality of computing devices may be arranged by a logic comparison program into compatibility arrangements. A "compatibility arrangement" as used in this disclosure is any grouping of objects and/or data based on skill level and/or output score. Membership function coefficients and/or constants as described above may be tuned according to classification and/or clustering algorithms. For instance, and without limitation, a clustering algorithm may determine a Gaussian or other distribution of questions about a centroid corresponding to a given compatibility threshold and/or version authenticator, and an iterative or other method may be used to find a membership function, for any membership function type as described above, that minimizes an average error from the statistically determined distribution, such that, for instance, a triangular or Gaussian membership function about a centroid representing a center of the distribution that most closely matches the distribution. Error functions to be minimized, and/or methods of minimization, may be performed without limitation according to any error function and/or error function minimization process and/or method as described in this disclosure.

Still referring to FIG. 6, inference engine may be implemented according to input composite terms 124 and patient identifiers 116. For instance, an acceptance variable may represent a first measurable value pertaining to the classification of composite terms 124 to patient identifiers 116. Continuing the example, an output variable may represent context score 132 associated with the user. In an embodiment, composite terms 124 and/or patient identifiers 116 may be represented by their own fuzzy set. In other embodiments, the classification of the data into context score 132 may be represented as a function of the intersection two fuzzy sets as shown in FIG. 6, An inference engine may combine rules, such as any semantic versioning, semantic language, version ranges, and the like thereof. The degree to which a given input function membership matches a given rule may be determined by a triangular norm or "T-norm" of the rule or output function with the input function, such as min (a, b), product of a and b, drastic product of a and b, Hamacher product of a and b, or the like, satisfying the rules of commutativity (T(a, b)=T(b, a)), monotonicity: (T(a, b)≤T(c, d) if a≤c and b≤d), (associativity: T(a, T(b, c))=T (T(a, b), c)), and the requirement that the number 1 acts as an identity element. Combinations of rules ("and" or "or" combination of rule membership determinations) may be performed using any T-conorm, as represented by an inverted T symbol or "⊥," such as max(a, b), probabilistic sum of a and b (a+b−a*b), bounded sum, and/or drastic T-conorm; any T-conorm may be used that satisfies the properties of commutativity: ⊥(a, b)=⊥(b, a), monotonicity: ⊥(a, b)≤⊥(c, d) if a≤c and b≤d, associativity: ⊥(a, ⊥(b, c))=⊥(⊥(a, b), c), and identity element of 0. Alternatively or additionally T-conorm may be approximated by sum, as in a "product-sum" inference engine in which T-norm is product and T-conorm is sum. A final output score or other fuzzy inference output may be determined from an output membership function as described above using any suitable defuzzification process, including without limitation Mean of Max defuzzification, Centroid of Area/Center of Gravity defuzzification, Center Average defuzzification, Bisector of Area defuzzification, or the like. Alternatively or additionally, output rules may be replaced with functions according to the Takagi-Sugeno-King (TSK) fuzzy model.

A first fuzzy set 604 may be represented, without limitation, according to a first membership function 608 representing a probability that an input falling on a first range of values 612 is a member of the first fuzzy set 604, where the first membership function 608 has values on a range of probabilities such as without limitation the interval [0,1], and an area beneath the first membership function 608 may represent a set of values within first fuzzy set 604. Although first range of values 612 is illustrated for clarity in this exemplary depiction as a range on a single number line or axis, first range of values 612 may be defined on two or more dimensions, representing, for instance, a Cartesian product between a plurality of ranges, curves, axes, spaces, dimensions, or the like. First membership function 608 may include any suitable function mapping first range 612 to a probability interval, including without limitation a triangular function defined by two linear elements such as line segments or planes that intersect at or below the top of the probability interval. As a non-limiting example, triangular membership function may be defined as:

$$y(x, a, b, c) = \begin{cases} 0, & \text{for } x > c \text{ and } x < a \\ \frac{x-a}{b-a}, & \text{for } a \le x < b \\ \frac{c-x}{c-b}, & \text{if } b < x \le c \end{cases}$$

a trapezoidal membership function may be defined as:

$$y(x, a, b, c, d) = \max\left(\min\left(\frac{x-a}{b-a}, 1, \frac{d-x}{d-c}\right), 0\right)$$

a sigmoidal function may be defined as:

$$y(x, a, c) = \frac{1}{1 - e^{-a(x-c)}}$$

a Gaussian membership function may be defined as:

$$y(x, c, \sigma) = e^{-\frac{1}{2}\left(\frac{x-c}{\sigma}\right)^2}$$

and a bell membership function may be defined as:

$$y(x, a, b, c,) = \left[1 + \left|\frac{x-c}{a}\right|^{2b}\right]^{-1}$$

Persons skilled in the art, upon reviewing the entirety of this disclosure, will be aware of various alternative or additional membership functions that may be used consistently with this disclosure.

First fuzzy set 604 may represent any value or combination of values as described above, including any composite terms 124 and patient identifiers 116. A second fuzzy set 616, which may represent any value which may be represented by first fuzzy set 604, may be defined by a second membership function 620 on a second range 624; second range 624 may be identical and/or overlap with first range 612 and/or may be combined with first range via Cartesian product or the like to generate a mapping permitting evaluation overlap of first fuzzy set 604 and second fuzzy set 616. Where first fuzzy set 604 and second fuzzy set 616 have a region 636 that overlaps, first membership function 608 and second membership function 620 may intersect at a point 632 representing a probability, as defined on probability interval, of a match between first fuzzy set 604 and second fuzzy set 616. Alternatively or additionally, a single value of first and/or second fuzzy set may be located at a locus 636 on first range 612 and/or second range 624, where a probability of membership may be taken by evaluation of first membership function 608 and/or second membership function 620 at that range point. A probability at 628 and/or 632 may be compared to a threshold 640 to determine whether a positive match is indicated. Threshold 640 may, in a non-limiting example, represent a degree of match between first fuzzy set 604 and second fuzzy set 616, and/or single values therein with each other or with either set, which is sufficient for purposes of the matching process; for instance, the classification into one or more query categories may indicate a sufficient degree of overlap with fuzzy set representing composite terms 124 and patient identifiers 116 for combination to occur as described above. Each threshold may be established by one or more user inputs. Alternatively or additionally, each threshold may be tuned by a machine-learning and/or statistical process, for instance and without limitation as described in further detail below.

In an embodiment, a degree of match between fuzzy sets may be used to rank one resource against another. For instance, if both composite terms 124 and patient identifiers 116 have fuzzy sets, context score 132 may be generated by having a degree of overlap exceeding a predictive threshold, processor 104 may further rank the two resources by ranking a resource having a higher degree of match more highly than a resource having a lower degree of match. Where multiple fuzzy matches are performed, degrees of match for each respective fuzzy set may be computed and aggregated through, for instance, addition, averaging, or the like, to determine an overall degree of match, which may be used to rank resources; selection between two or more matching resources may be performed by selection of a highest-ranking resource, and/or multiple notifications may be presented to a user in order of ranking.

Figure 7:
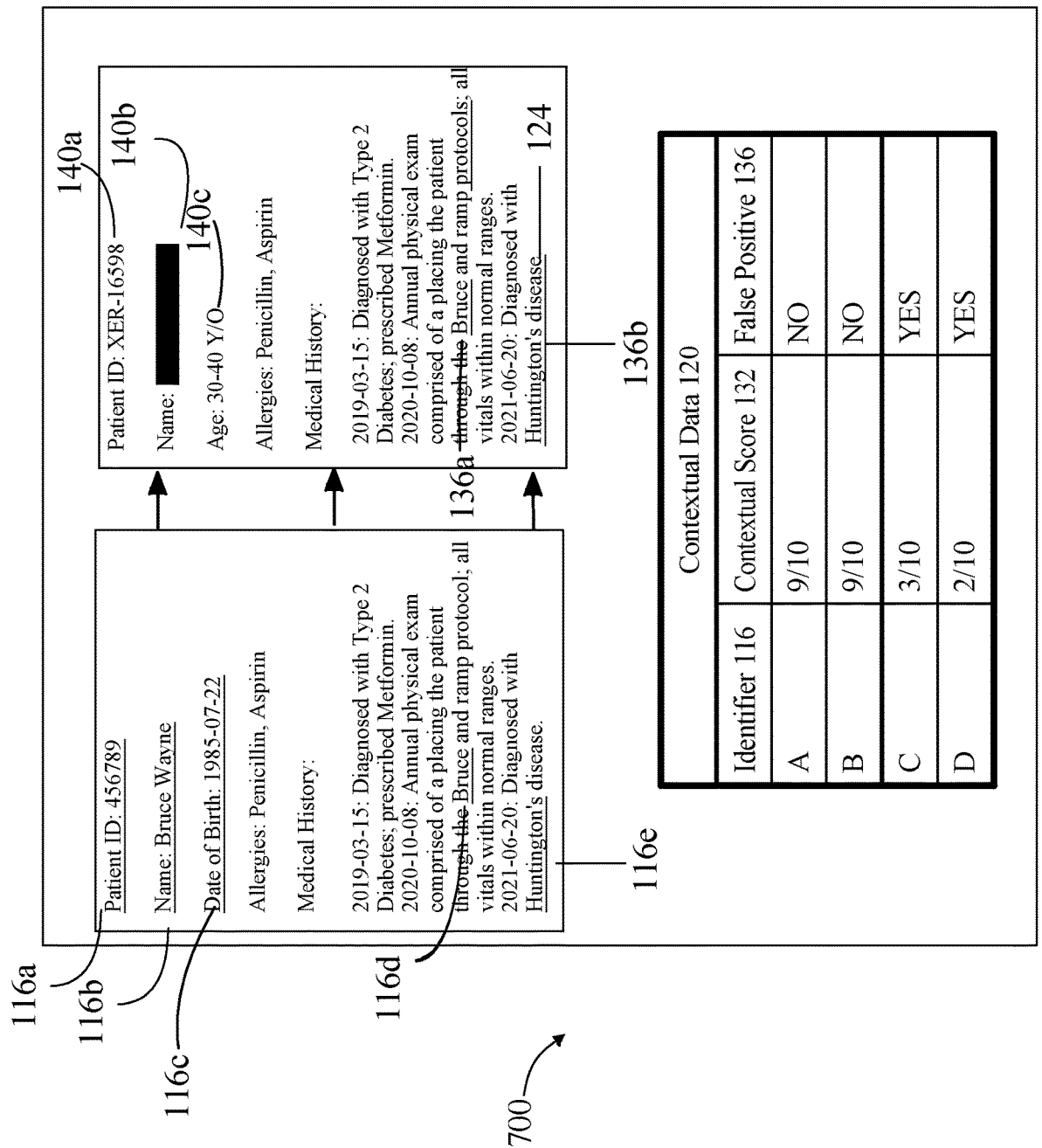
FIG. 7 is an illustration of an exemplary embodiment of a user interface.

Referring now to FIG. 7, an illustration of an exemplary embodiment of user interface 700. User interface 700 may act as the front-end display through which the process of data anonymization is presented to the user. It may be designed to intake and showcase a variety of user data 108, such as names, identification numbers, contact details, and medical histories. The processor analyzes the user data 108 to identify patient identifiers 116a-d. These identifiers may include any data that can directly or indirectly reveal the identity of a user, necessitating their anonymization to protect user privacy. Before anonymizing the patient identifiers 116a-d, processor 104 may evaluate the dataset to discern any false positive patient identifiers 136a-b. False positives terms 136 are terms that may be mistaken for patient identifiers 116 but are not relevant for anonymization (e.g., common terms, medical terminology not linked to an individual's identity). To accurately identify false positive patient identifiers 136, the processor 104 may compare patient identifiers 116a-d against a set of composite terms 124. This comparison may be used to differentiate between terms that need anonymization and those that do not. The process may involve generating a contextual score 132 for each term, quantitatively evaluating how closely a term is linked to an actual patient identifier versus being a false positive. Upon identifying false positive patient identifiers 136, apparatus 100 may remove the false positive patient identifiers 136 from the set of patient identifiers 116a-d. This may be done to ensure that these terms are not anonymized unnecessarily. The processor 104 may then proceed to replace the genuine patient identifiers 116a-c with anonymization data 140a-c. This step involves substituting sensitive information with pseudonyms or other forms of non-identifiable data, effectively masking the user's identity while retaining the data's utility for medical or analytical purposes.

Figure 8:
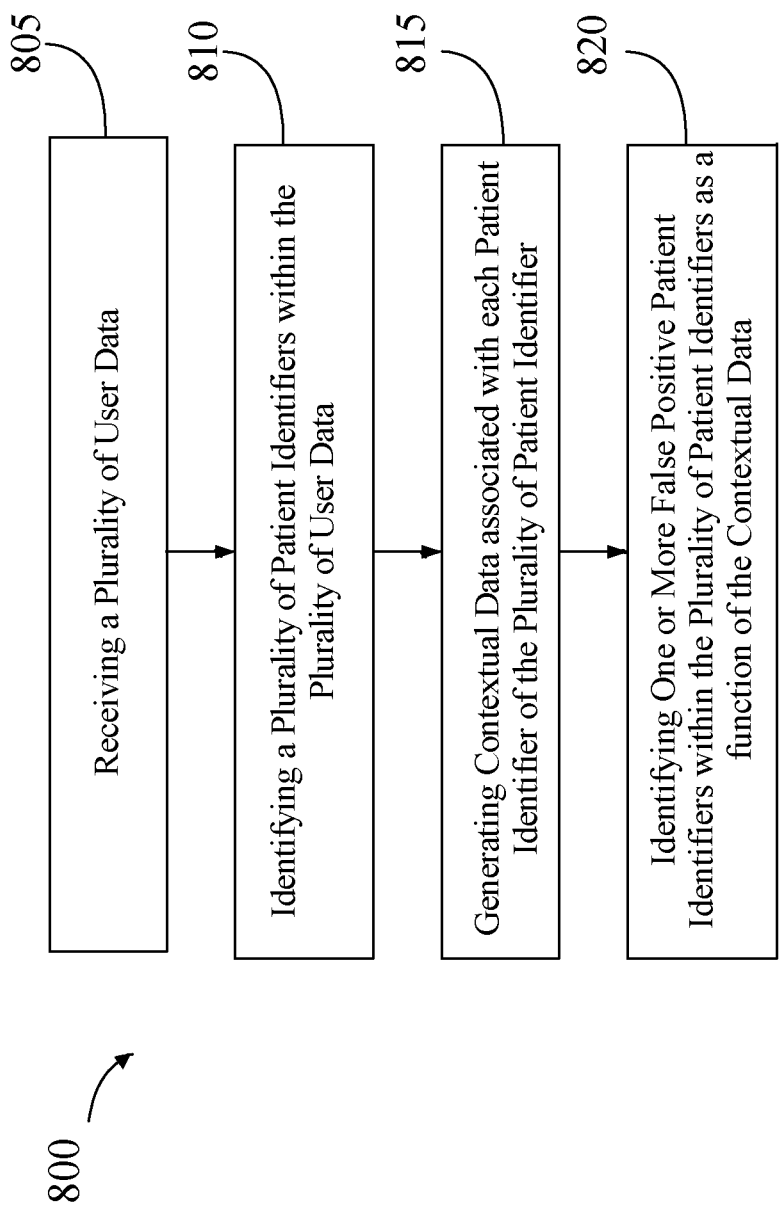
FIG. 8 is a flow diagram of an exemplary method for the anonymization of user data.

Referring now to FIG. 8, a flow diagram of an exemplary method 800 for the anonymization of user data is illustrated. At step 805, method 800 includes receiving, using at least a processor, a plurality of user data. This may be implemented as described and with reference to FIGS. 1-7. In some embodiments, receiving the plurality of user data may include receiving the plurality of user data from one or more electronic health records or an application program interface.

Still referring to FIG. 8, at step 810, method 800 includes identifying, using the at least a processor, a plurality of patient identifiers within the plurality of user data. This may be implemented as described and with reference to FIGS. 1-7. In an embodiment, identifying the plurality of patient identifiers may include identifying the plurality of patient identifiers using a named entity recognition system.

Still referring to FIG. 8, at step 815, method 800 includes generating, using the at least a processor, contextual data associated with each patient identifier of the plurality of patient identifier. This may be implemented as described and with reference to FIGS. 1-7. In some cases, generating contextual data associated with each patient identifier may include identifying a set of composite terms within the plurality of user data. In other embodiments, the method may include generating, using the at least a processor, a contextual score as a function of the comparing each patient identifier of the plurality of patient identifiers to the set of composite terms. In an additional embodiment, generating contextual data may include iteratively training a context machine-learning model using contextual training data, wherein contextual training data comprises examples of patient identifiers as inputs correlated to examples of contextual data as outputs, The contextual data may be generated using the trained context machine-learning model.

Still referring to FIG. 8, at step 820, method 800 includes identifying, using the at least a processor, one or more false positive patient identifiers within the plurality of patient identifiers as a function of the contextual data. This may be implemented as described and with reference to FIGS. 1-7. In an embodiment, the method may include filtering, using the at least a processor, the plurality of patient identifiers as a function of the set of composite terms. The method may also include identifying, using the at least a processor, the one or more false positive patient identifiers within the plurality of patient identifiers as a function of the filtering. The method may include removing, using the at least a processor, the one or more false positive patient identifiers from the plurality of patient identifiers. In an embodiment, the method may include generating, using the at least a processor, anonymized data corresponding to each patient identifier of the plurality of patient identifiers.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 9:
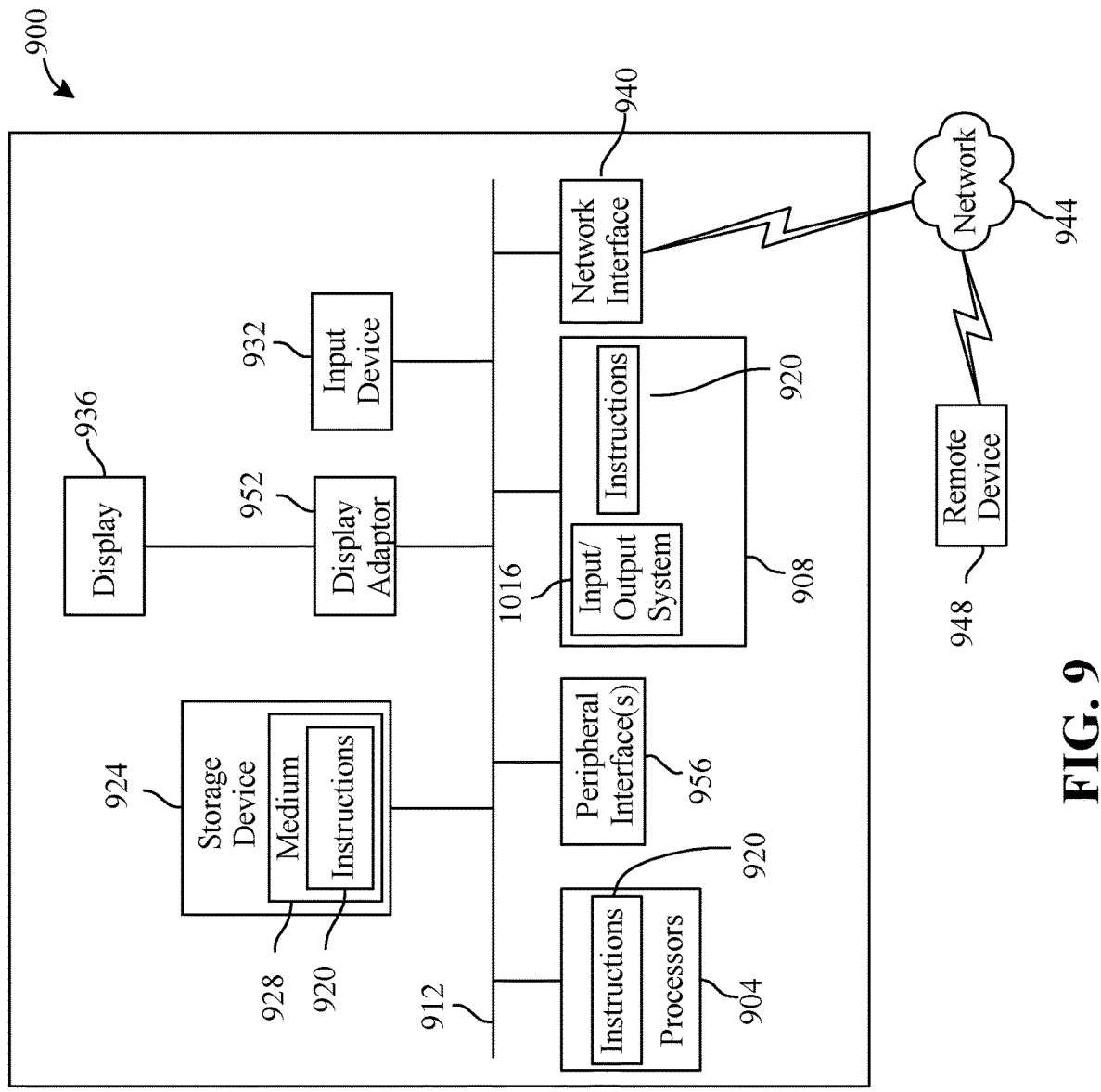
FIG. 9 is a block diagram of a computing system that can be used to implement any one or more of the methodologies disclosed herein and any one or more portions thereof.

FIG. 9 shows a diagrammatic representation of one embodiment of a computing device in the exemplary form of a computer system 900 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 900 includes a processor 904 and a memory 908 that communicate with each other, and with other components, via a bus 912. Bus 912 may include any of several types of bus structures including, but not limited to, a memory bus, a memory controller, a peripheral bus, a local bus, and any combinations thereof, using any of a variety of bus architectures.

Processor 904 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 904 may be organized according to Von Neumann and/or Harvard architecture as a non-limiting example. Processor 904 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 908 may include various components (e.g., machine-readable media) including, but not limited to, a random-access memory component, a read only component, and any combinations thereof. In one example, a basic input/output system 916 (BIOS), including basic routines that help to transfer information between elements within computer system 900, such as during start-up, may be stored in memory 908. Memory 908 may also include (e.g., stored on one or more machine-readable media) instructions (e.g., software) 920 embodying any one or more of the aspects and/or methodologies of the present disclosure. In another example, memory 908 may further include any number of program modules including, but not limited to, an operating system, one or more application programs, other program modules, program data, and any combinations thereof.

Computer system 900 may also include a storage device 924. Examples of a storage device (e.g., storage device 924) include, but are not limited to, a hard disk drive, a magnetic disk drive, an optical disc drive in combination with an optical medium, a solid-state memory device, and any combinations thereof. Storage device 924 may be connected to bus 912 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 924 (or one or more components thereof) may be removably interfaced with computer system 900 (e.g., via an external port connector (not shown)). Particularly, storage device 924 and an associated machine-readable medium 928 may provide nonvolatile and/or volatile storage of machine-readable instructions, data structures, program modules, and/or other data for computer system 900. In one example, software 920 may reside, completely or partially, within machine-readable medium 928. In another example, software 920 may reside, completely or partially, within processor 904.

Computer system 900 may also include an input device 932. In one example, a user of computer system 900 may enter commands and/or other information into computer system 900 via input device 932. Examples of an input device 932 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 932 may be interfaced to bus 912 via any of a variety of interfaces (not shown) including, but not limited to, a serial interface, a parallel interface, a game port, a USB interface, a FIRE-WIRE interface, a direct interface to bus 912, and any combinations thereof. Input device 932 may include a touch screen interface that may be a part of or separate from display 936, discussed further below. Input device 932 may be utilized as a user selection device for selecting one or more graphical representations in a graphical interface as described above.

A user may also input commands and/or other information to computer system 900 via storage device 924 (e.g., a removable disk drive, a flash drive, etc.) and/or network interface device 940. A network interface device, such as network interface device 940, may be utilized for connecting computer system 900 to one or more of a variety of networks, such as network 944, and one or more remote devices 948 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 944, may employ a wired and/or a wireless mode of communication. In general, any network topology may be used. Information (e.g., data, software 920, etc.) may be communicated to and/or from computer system 900 via network interface device 940.

Computer system 900 may further include a video display adapter 952 for communicating a displayable image to a display device, such as display device 936. Examples of a display device include, but are not limited to, a liquid crystal display (LCD), a cathode ray tube (CRT), a plasma display, a light emitting diode (LED) display, and any combinations thereof. Display adapter 952 and display device 936 may be utilized in combination with processor 904 to provide graphical representations of aspects of the present disclosure. In addition to a display device, computer system 900 may include one or more other peripheral output devices including, but not limited to, an audio speaker, a printer, and any combinations thereof. Such peripheral output devices may be connected to bus 912 via a peripheral interface 956. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions, and additions may be made to that which is specifically disclosed herein without departing from the spirit and scope of the present invention.

What is claimed is:

1. An apparatus for anonymizing user data, wherein the apparatus comprises:
   at least a processor; and
   a memory communicatively connected to the at least a processor, wherein the memory contains instructions configuring the at least a processor to:
   receive a plurality of user data;
   identify a plurality of patient identifiers within the plurality of user data;
   generate contextual data associated with each patient identifier of the plurality of patient identifiers, wherein generating the contextual data associated with each patient identifier comprises identifying a set of composite terms within the plurality of user data, wherein at least one composite term of the set of composite terms is crafted by integrating one or more patient identifiers with one or more related terms, wherein the integration creates at least a phrase that provides additional context to the at least one composite term;
   generate anonymized data corresponding to the plurality of patient identifiers; and
   identify one or more false positive patient identifiers within the plurality of patient identifiers as a function of the contextual data.

2. The apparatus of claim 1, wherein the memory further contains instructions configuring the at least a processor to:
   compare each patient identifier of the plurality of patient identifiers to the set of composite terms; and
   generate a contextual score for each patient identifier of the plurality of patient identifiers as a function of the comparison.

3. The apparatus of claim 1, wherein the memory further contains instructions configuring the at least a processor to:
   filter the plurality of patient identifiers as a function of the set of composite terms; and
   identify the one or more false positive patient identifiers within the plurality of patient identifiers as a function of the filtering.

4. The apparatus of claim 1, wherein identifying the set of composite terms comprises receiving the set of composite terms from a dictionary data structure.

5. The apparatus of claim 1, wherein generating the contextual data comprises:
   iteratively training a context machine-learning model using contextual training data, wherein the contextual training data comprises examples of patient identifiers as inputs correlated to examples of contextual data as outputs; and
   generating the contextual data using the trained context machine-learning model.

6. The apparatus of claim 1, wherein the memory further contains instructions configuring the at least a processor to remove the one or more false positive patient identifiers from the plurality of patient identifiers.

7. The apparatus of claim 1, wherein identifying the plurality of patient identifiers comprises identifying the plurality of patient identifiers using a natural language processing module.

8. The apparatus of claim 1, wherein receiving the plurality of user data comprises receiving the plurality of user data from one or more electronic health records (EHRs).

9. A method for an anonymization of user data, wherein the method comprises:
   receiving, using at least a processor, a plurality of user data;
   identifying, using the at least a processor, a plurality of patient identifiers within the plurality of user data;
   generating, using the at least a processor, contextual data associated with each patient identifier of the plurality of patient identifiers, wherein generating the contextual data associated with each patient identifier comprises identifying a set of composite terms within the plurality of user data, wherein at least one composite term of the set of composite terms is crafted by integrating one or more patient identifiers with one or more related terms, wherein the integration creates at least a phrase that provides additional context to the at least one composite term;
   generating, using the at least a processor, anonymized data corresponding to the plurality of patient identifiers; and
   identifying, using the at least a processor, one or more false positive patient identifiers within the plurality of patient identifiers as a function of the contextual data.

10. The method of claim 9, wherein the method further comprises:
    comparing, using the at least a processor, each patient identifier of the plurality of patient identifiers to the set of composite terms; and
    generating, using the at least a processor, a contextual score for each patient identifier of the plurality of patient identifiers as a function of the comparison.

11. The method of claim 9, wherein the method further comprises:
    filtering, using the at least a processor, the plurality of patient identifiers as a function of the set of composite terms; and
    identifying, using the at least a processor, the one or more false positive patient identifiers within the plurality of patient identifiers as a function of the filtering.

12. The method of claim 9, wherein identifying the set of composite terms comprises receiving the set of composite terms from a dictionary data structure.

13. The method of claim 9, wherein generating the contextual data comprises:
    iteratively training a context machine-learning model using contextual training data, wherein the contextual training data comprises examples of patient identifiers as inputs correlated to examples of contextual data as outputs; and
    generating the contextual data using the trained context machine-learning model.

14. The method of claim 9, wherein the method further comprises removing, using the at least a processor, the one or more false positive patient identifiers from the plurality of patient identifiers.

15. The method of claim 9, wherein identifying the plurality of patient identifiers comprises identifying the plurality of patient identifiers using a natural language processing module.

16. The method of claim 9, wherein receiving the plurality of user data comprises receiving the plurality of user data from one or more electronic health records (EHRs).

* * * * *